United States Patent
Fang et al.

(10) Patent No.: US 10,374,925 B2
(45) Date of Patent: Aug. 6, 2019

(54) METHOD, APPARATUS, AND SYSTEM FOR MEASURING NETWORK DELAY

(71) Applicant: HUAWEI TECHNOLOGIES CO., LTD., Shenzhen, Guangdong (CN)

(72) Inventors: Wei Fang, Beijing (CN); Hongming Liu, Beijing (CN); Wenjun Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 288 days.

(21) Appl. No.: 14/669,513

(22) Filed: Mar. 26, 2015

(65) Prior Publication Data
US 2015/0207712 A1 Jul. 23, 2015

Related U.S. Application Data

(63) Continuation of application No. PCT/CN2012/082490, filed on Sep. 29, 2012.

(51) Int. Cl.
*H04L 12/26* (2006.01)
*H04W 56/00* (2009.01)
*H04L 12/851* (2013.01)

(52) U.S. Cl.
CPC ........ *H04L 43/0852* (2013.01); *H04L 43/106* (2013.01)

(58) Field of Classification Search
CPC .. H04L 43/0852; H04L 43/106; H04L 7/0037
(Continued)

(56) References Cited

U.S. PATENT DOCUMENTS

| 4,665,519 A | * | 5/1987 | Kirchner | ............... H04W 72/12 370/349 |
| 2003/0039249 A1 | * | 2/2003 | Basso | ..................... H04L 49/25 370/394 |

(Continued)

FOREIGN PATENT DOCUMENTS

| CN | 101056215 A | 10/2007 |
| CN | 101854268 A | 10/2010 |

(Continued)

OTHER PUBLICATIONS

R. Braden, Editor, Requirements for Internet Hosts—Communication Layers, Network Working Group Internet Engineering Task Force, RFC 1122, Oct. 1989. total 116 pages.

(Continued)

*Primary Examiner* — Asad M Nawaz
*Assistant Examiner* — Jason A Harley
(74) *Attorney, Agent, or Firm* — Huawei Technologies Co., Ltd.

(57) ABSTRACT

A method, an apparatus, and a system for measuring a network delay are disclosed. The method includes: acquiring delay measurement information obtained by measuring a service flow by at least one target logical port TLP, where the delay measurement information includes: timestamp information, a service flow identifier, and a TLP identifier; and transmitting the delay measurement information to a measurement control point MCP, so that the MCP determines details about a network delay according to the timestamp information, the service flow identifier, and the TLP identifier. Embodiments of the present application further provide an apparatus and a system for measuring a network delay. Embodiments of the present application achieve direct and accurate delay measurement of a service flow in scenarios of point to point transmission or point to multi- (Continued)

point transmission on the network, and reflect details about a real delay of the service flow.

37 Claims, 11 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2003/0043744 A1* | 3/2003 | Lu | H04L 47/10 370/236 |
| 2005/0102412 A1* | 5/2005 | Hirsimaki | H04L 69/16 709/232 |
| 2006/0020736 A1* | 1/2006 | Jackson | G06F 13/385 710/313 |
| 2007/0147437 A1* | 6/2007 | Yasui | H04L 1/1854 370/519 |
| 2008/0117937 A1* | 5/2008 | Firestone | H04N 5/4401 370/503 |
| 2009/0006711 A1* | 1/2009 | Biran | G06F 13/4282 710/316 |
| 2011/0007648 A1* | 1/2011 | Liu | H04L 41/5003 370/252 |
| 2011/0183689 A1* | 7/2011 | Kim | G01S 5/0018 455/456.1 |
| 2011/0292797 A1 | 12/2011 | Bejerano | |
| 2012/0026869 A1* | 2/2012 | Wang | H04L 41/5003 370/230 |
| 2012/0106356 A1* | 5/2012 | Johansson | H04W 24/08 370/241.1 |
| 2012/0230186 A1* | 9/2012 | Lee | H04L 43/028 370/230 |
| 2014/0040527 A1* | 2/2014 | Kanigicherla | G06F 13/4022 710/316 |
| 2014/0043987 A1* | 2/2014 | Watve | H04L 45/70 370/252 |

FOREIGN PATENT DOCUMENTS

| | | |
|---|---|---|
| EP | 1684463 A1 | 7/2006 |
| EP | 2498445 A1 | 9/2012 |
| WO | 2012059138 A1 | 5/2012 |

OTHER PUBLICATIONS

K. Nichols et al, Definition of the Differentiated Services Field (DS Field) in the IPv4 and IPv6 Headers, Network Working Group, RFC2474 Dec. 1998. total 20 pages.

K. Ramakrishnan et al, The Addition of Explicit Congestion Notification (ECN) to IP, Network Working Group, RFC3168, Sep. 2001. total 63 pages.

C. Demichelis et al, IP Packet Delay Variation Metric for IP Performance Metrics (IPPM), Network Working Group, RFC 3393, Nov. 2002. total 21 pages.

S. Shalunov et al, A One-way Active Measurement Protocol (OWAMP), Network Working Group, RFC4656, Sep. 2006. total 56 pages.

K. Hedayat et al, A Two-Way Active Measurement Protocol (TWAMP), Network Working Group, RFC 5357, Oct. 2008. total 26 pages.

D. Frost et al, Packet Loss and Delay Measurement for MPLS Networks, Internet Engineering Task Force (IETF), RFC6374, Sep. 2011. total 52 pages.

D. Frost, Ed et al, A Packet Loss and Delay Measurement Profile for MPLS-Based Transport Networks, Internet Engineering Task Force (IETF), RFC6375, Sep. 2011. total 5 pages.

Series G: Transmission Systems and Media,Digital Systems and Networks Packet over Transport aspects—Ethernet over Transport aspects Series Y: Global Information Infrastructure, Internet Protocol Aspects and Next-Generation Networks Internet protocol aspects—Operation, administration and maintenance, ITU-T G.8013/Y.1731, May 2012.

* cited by examiner

METHOD, APPARATUS, AND SYSTEM FOR MEASURING NETWORK DELAY

CROSS-REFERENCE

This application is a continuation of International Application No. PCT/CN2012/082490, filed on Sep. 29, 2012, which is hereby incorporated by reference in its entiretiy.

TECHNICAL FIELD

The present application relates to communications technologies, and in particular, to a method, an apparatus, and a system for measuring a network delay.

BACKGROUND

With continuous development of network information technologies, IP (Internet Protocol)-based networks are prevailing. Under such circumstances, how to conduct a delay performance quality evaluation for IP-based services has become an increasingly prominent problem.

In the prior art, a delay of a network service flow is measured mainly by inserting a dedicated delay measurement packet into a measurement end, where the delay measurement packet carries timestamps of a transmitting end and a receiving end. A delay result of the network service flow is then calculated according to receiving timestamp and transmitting timestamp in the delay measurement packet.

However, because the prior art employs indirect measurement of the delay measurement packet, delay performance of the network service flow cannot be truly and accurately reflected.

SUMMARY

Embodiments of the present application provide a method, an apparatus, and a system for measuring a network delay, to achieve measurement of a delay of a network service flow.

According to one aspect, an embodiment of the present application provides a method for measuring a network delay, including:

acquiring delay measurement information obtained by measuring a service flow by at least one target logical port TLP, where the delay measurement information includes: timestamp information, a service flow identifier, and a TLP identifier; and transmitting the delay measurement information to a measurement control point MCP, so that the MCP determines details about a network delay according to the timestamp information, the service flow identifier, and the TLP identifier.

Optionally, in the foregoing method for measuring a network delay, the acquiring delay measurement information obtained by measuring a service flow by at least one TLP, may include: the acquiring delay measurement information obtained by measuring a service flow by at least one TLP includes:

acquiring, by a data collecting point DCP managing an upstream TLP, transmit-end delay measurement information obtained by measuring a transmitted service flow by at least one upstream TLP; and acquiring, by a DCP managing a downstream TLP, receive-end delay measurement information obtained by measuring a received service flow by at least one downstream TLP;

the transmitting the delay measurement information to an MCP includes:

transmitting, by the DCP managing the upstream TLP, the transmit-end delay measurement information to the MCP, where the transmit-end delay measurement information includes: transmit-end timestamp information, a service flow identifier, and a TLP identifier; and transmitting, by the DCP managing the downstream TLP, the receive-end delay measurement information to the MCP, where the receive-end delay measurement information includes: receive-end timestamp information, a service flow identifier, and a TLP identifier.

Optionally, the forgoing method for measuring a network delay may include:

when a measurement period ends, acquiring, by the DCP managing the upstream TLP, a measurement period identifier, and transmitting the measurement period identifier to the MCP; and acquiring, by the DCP managing the downstream TLP, start time of the measurement period; where if a difference between the start time and the timestamp information is less than or equal to a preset duration, the receive-end delay measurement information pertains to measurement information corresponding to the measurement period identifier; and if the difference between the start time and the timestamp information is greater than the preset duration, the measurement period identifier is increased by 1, the timestamp information pertains to a next measurement period, and the measurement period identifier is transmitted to the MCP.

Optionally, in the forgoing method for measuring a network delay, the preset duration is ⅔ of a duration of the measurement period.

Optionally, the forgoing method for measuring a network delay may include:

performing, by the DCP managing the upstream TLP, time synchronization with the upstream TLP by using the NTP or an IEEE 1588v2 clock; performing, by the DCP managing the downstream TLP, time synchronization with the downstream TLP by using the NTP or an IEEE 1588v2 clock; and performing, by the DCP managing the upstream TLP, time synchronization with the DCP managing the downstream TLP by using the NTP or an IEEE 1588v2 clock.

Optionally, the forgoing method for measuring a network delay may include:

acquiring, by the DCP managing the downstream TLP, a measurement packet transmitted by the upstream TLP and received by the at least one downstream TLP, and arrival timestamp information of the measurement packet, which is generated when the measurement packet arrives at the downstream TLP, where the measurement packet includes: transmit-end timestamp information; and determining, by the DCP managing the downstream TLP, whether the arrival timestamp information and the receive-end timestamp information pertain to a preset duration range; and if the arrival timestamp information and the receive-end timestamp information pertain to the preset duration range, determining that the transmit-end timestamp information and the receive-end timestamp information pertain to a same data packet, and transmitting a result of the determining to the MCP.

Optionally, in the forgoing method for measuring a network delay, the transmit-end delay measurement information further includes: transmit-end service flow characteristic information and a transmit-end fragment reassembly identifier; and the receive-end delay measurement information further includes: receive-end service flow characteristic information and a receive-end fragment reassembly identifier, so that the MCP determines, according to the transmit-end service flow characteristic information, the transmit-end fragment reassembly identifier, the receive-end service flow characteristic information, and the receive-end fragment reassembly identifier, that the transmit-end timestamp information and the receive-end timestamp information are timestamp information corresponding to a same service flow.

According to another aspect, an embodiment of the present application provides a method for measuring a network delay, including:

identifying a service flow according to service flow characteristic information, and determining whether the service flow is a target service flow;

if the service flow is a target service flow, adding a delay measurement flag to a data packet of the service flow, and acquiring data packet delay measurement information corresponding to the delay measurement flag; and determining delay measurement information, where the delay measurement information includes: timestamp information, a service flow identifier, a TLP identifier, so that after acquiring the delay measurement information, a DCP transmits the delay measurement information to an MCP.

Optionally, in the method for measuring a network delay, the adding a delay measurement flag to a data packet of the service flow, and acquiring data packet delay measurement information corresponding to the delay measurement flag includes:

adding, by an upstream TLP, a delay measurement flag to the data packet of the target service flow, and acquiring transmit-end delay measurement information of the data packet corresponding to the delay measurement flag, where the transmit-end delay measurement information includes: transmit-end timestamp information, a service flow identifier, and a TLP identifier, so that after acquiring the transmit-end delay measurement information, a DCP managing the upstream TLP transmits the transmit-end delay measurement information to the MCP; and when identifying the data packet to which the delay measurement flag is added, acquiring, by a downstream TLP, receive-end delay measurement information of the data packet corresponding to the delay measurement flag, where the receive-end delay measurement information includes: receive-end timestamp information, a service flow identifier, and a TLP identifier, so that after acquiring the receive-end delay measurement information, a DCP managing the downstream TLP transmits the receive-end delay measurement information to the MCP.

Optionally, the method for measuring a network delay further includes:

before adding the delay measurement flag to the data packet of the target service flow, performing, by the upstream TLP, time synchronization with the DCP managing the upstream TLP by using the NTP or an IEEE 1588v2 clock; and before identifying the data packet to which the delay measurement flag is added, performing, by the downstream TLP, time synchronization with the DCP managing the downstream TLP by using the NTP or an IEEE 1588v2 clock;

the adding a delay measurement flag to a data packet of the service flow, and acquiring data packet delay measurement information corresponding to the delay measurement flag further includes:

adding, by the upstream TLP, a delay measurement flag to the data packet of the target service flow, acquiring a measurement period identifier corresponding to the delay measurement flag, so that after acquiring the measurement period identifier, the DCP managing the upstream TLP transmits information about the measurement period identifier to the MCP; and acquiring, by the downstream TLP, start time of each measurement period within the measurement period, and when identifying, within each measurement period, the data packet to which the delay measurement flag is added, acquiring the measurement period identifier corresponding to the delay measurement flag, so that after acquiring the start time and the measurement period identifier, the DCP managing the downstream TLP transmits information about the measurement period identifier to the MCP.

Optionally, the method for measuring a network delay further includes:

transmitting, by the upstream TLP, a measurement packet to the downstream TLP, where the measurement packet includes: transmit-end timestamp information; and receiving, by a receiving module of the downstream TLP, the measurement packet, generating arrival timestamp information of the measurement packet, and transmitting the measurement packet and the arrival timestamp information to the DCP managing the downstream TLP, so that the DCP determines whether the arrival timestamp information and receive-end timestamp information pertain to a preset duration range, and if the arrival timestamp information and the receive-end timestamp information pertain to the preset duration range, determines that the transmit-end timestamp information and the receive-end timestamp information pertain to a same data packet and transmits a result of the determining to the MCP.

Optionally, in the method for measuring a network delay, the transmit-end delay measurement information further includes: transmit-end service flow characteristic information and a transmit-end fragment reassembly identifier; and the receive-end delay measurement information further includes: receive-end service flow characteristic information and a receive-end fragment reassembly identifier;

so that the DCP managing the upstream TLP acquires the transmit-end delay measurement information and transmits the transmit-end delay measurement information to the MCP, and the DCP managing the downstream TLP acquires the receive-end delay measurement information and transmits the receive-end delay measurement information to the MCP; therefore, the MCP determines, according to the transmit-end service flow characteristic information, the transmit-end fragment reassembly identifier, the receive-end service flow characteristic information, and the receive-end fragment reassembly identifier, that the transmit-end timestamp information and the receive-end timestamp information are timestamp information corresponding to a same data packet.

Optionally, in the method for measuring a network delay, the adding, by an upstream TLP, a delay measurement flag to the data packet of the target service flow includes:

adding the delay measurement flag in a reserved bit of TOS or a reserved bit of Flags in an IP header of the data packet.

Optionally, in the method for measuring a network delay, the identifying a service flow according to service flow characteristic information includes:

identifying the service flow according to information about at least two tuples in a quintuple.

According to still another aspect, an embodiment of the present application provides a method for measuring a network delay, including:

receiving transmit-end delay measurement information transmitted by a DCP corresponding to an upstream TLP and receive-end delay measurement information transmitted by a DCP corresponding to a downstream TLP, where the transmit-end delay measurement information includes: transmit-end timestamp information, a service flow identifier, and a TLP identifier; and the receive-end delay measurement information includes: receive-end timestamp information, a service flow identifier, and a TLP identifier; and determining details about a single network delay according to the transmit-end delay measurement information and the receive-end delay measurement information.

Optionally, the method for measuring a network delay further includes:

receiving, by an MCP, a measurement period identifier transmitted by the DCP managing the upstream TLP, receiving, by the MCP, a measurement period identifier transmitted by the DCP managing the downstream TLP, determining, by the MCP according to the measurement period identifier transmitted by the DCP managing the upstream TLP and the measurement period identifier transmitted by the DCP managing the downstream TLP, whether the transmit-end delay measurement information and the receive-end delay measurement information pertain to a same measurement period, and if the transmit-end delay measurement information and the receive-end delay measurement information pertain to a same measurement period, determining, by the MCP, the details about a single network delay according to the transmit-end delay measurement information and the receive-end delay measurement information.

Optionally, the method for measuring a network delay further includes:

receiving, by an MCP, the transmit-end delay measurement information transmitted by the DCP corresponding to the upstream TLP, receiving, by the MCP, the receive-end delay measurement information that is determined as pertaining to a same data packet as the transmit-end delay measurement information and is transmitted by the DCP corresponding to the downstream TLP, determining, by the MCP, the details about a single network delay according to the transmit-end delay measurement information and the receive-end delay measurement information.

Optionally, the method for measuring a network delay further includes:

receiving, by an MCP, the transmit-end delay measurement information transmitted by the DCP corresponding to the upstream TLP, where the transmit-end delay measurement information includes: the timestamp information, the service flow identifier, the TLP identifier, transmit-end service flow characteristic information, and a transmit-end fragment reassembly identifier;

receiving, by the MCP, the receive-end delay measurement information transmitted by the DCP corresponding to the downstream TLP, where the receive-end delay measurement information includes: the timestamp information, the service flow identifier, the TLP identifier, receive-end service flow characteristic information, and a receive-end fragment reassembly identifier; and determining, by the MCP according to the transmit-end service flow characteristic information, the transmit-end fragment reassembly identifier, the receive-end service flow characteristic information, and the receive-end fragment reassembly identifier, whether the transmit-end timestamp information and the receive-end timestamp information are timestamp information corresponding to a same data packet; and if the transmit-end timestamp information and the receive-end timestamp information are timestamp information corresponding to a same data packet, determining, by the MCP, the details about a single network delay according to the transmit-end delay measurement information and the receive-end delay measurement information.

According to one aspect, an embodiment of the present application provides a DCP, including:

an acquiring module, configured to acquire delay measurement information obtained by measuring a service flow by at least one TLP, where the delay measurement information includes: timestamp information, a service flow identifier, and a TLP identifier; and a transmitting module, configured to transmit the delay measurement information to a measurement control point MCP, so that the MCP determines details about a network delay according to the timestamp information, the service flow identifier, and the TLP identifier.

Optionally, the DCP is a DCP managing an upstream TLP; and the acquiring module is specifically configured to acquire transmit-end delay measurement information obtained by measuring a transmitted service flow by at least one upstream TLP;

or, the DCP is a DCP managing a downstream TLP; and the acquiring module is specifically configured to acquire receive-end delay measurement information obtained by measuring a received service flow by at least one downstream TLP;

the transmitting, by the DCP, the delay measurement information to an MCP includes:

the DCP is a DCP managing an upstream TLP; and the transmitting module is specifically configured to transmit the transmit-end delay measurement information to the MCP, where the transmit-end delay measurement information includes: transmit-end timestamp information, a service flow identifier, and a TLP identifier;

or, the DCP is a DCP managing a downstream TLP; and the transmitting module is specifically configured to transmit the receive-end delay measurement information to the MCP, where the receive-end delay measurement information includes: receive-end timestamp information, a service flow identifier, and a TLP identifier.

Optionally, in the DCP, the acquiring module includes:

a first acquiring unit, configured to acquire the transmit-end delay measurement information obtained by measuring the transmitted service flow by the at least one upstream TLP, or acquire the receive-end delay measurement information obtained by measuring the received service flow by the at least one downstream TLP; and a period identifier acquiring unit, configured to: when a measurement period ends, the DCP managing the upstream TLP acquires a measurement period identifier, and transmits the measurement period identifier to the MCP; or when a measurement period of the DCP managing the downstream TLP starts, the period identifier acquiring unit acquires start time of the measurement period, where if a difference between the start time and the timestamp information is less than or equal to a preset duration, the receive-end delay measurement information pertains to measurement information corresponding to the measurement period identifier; and if the difference between the start time and the timestamp information is greater than the preset duration, the measurement period identifier is increased by 1, the timestamp information pertains to a next measurement period, and a measurement period identifier of the DCP managing the downstream TLP within the measurement period is acquired;

the transmitting module includes:

a first transmitting unit, configured to transmit the transmit-end delay measurement information to the MCP, or transmit the receive-end delay measurement information to the MCP; and a second transmitting unit, configured to: when the measurement period ends, transmit to the MCP the measurement period identifier acquired by the period identifier acquiring unit of the DCP managing the upstream TLP, or transmit to the MCP the measurement period identifier acquired by the period identifier acquiring unit of the DCP managing the downstream TLP.

Optionally, in the DCP, the preset duration is ⅔ of a duration of the measurement period.

Optionally, the DCP further includes:

a time synchronization module, configured to: before the acquiring module acquires the delay measurement information obtained by the at least one TLP by measuring the service flow, perform time synchronization with the TLP by using the NTP or an IEEE 1588v2 clock, and perform time synchronization between the DCP managing the upstream TLP and the DCP managing the downstream TLP by using the NTP or an IEEE 1588v2 clock.

Optionally, in the DCP, the acquiring module includes:

a second acquiring unit, configured to acquire the transmit-end delay measurement information obtained by measuring the transmitted service flow by the at least one upstream TLP, or acquire the receive-end delay measurement information obtained by measuring the received service flow by the at least one downstream TLP; and a measurement packet acquiring unit, configured to acquire a measurement packet transmitted by the upstream TLP and received by the at least one downstream TLP, and arrival timestamp information of the measurement packet, which is generated when the measurement packet arrives at the downstream TLP, where the measurement packet includes: transmit-end timestamp information;

the determining module is specifically configured to determine whether the arrival timestamp information and the receive-end timestamp information pertain to a preset duration range; and if the arrival timestamp information and the receive-end timestamp information pertain to the preset duration range, determine that the transmit-end timestamp information and the receive-end timestamp information pertain to a same data packet;

the transmitting module is specifically configured to transmit a result of the determining to the MCP.

Optionally, the DCP is a data collecting point managing an upstream TLP;

the acquiring module is specifically configured to acquire the transmit-end delay measurement information, where the transmit-end delay measurement information further includes: transmit-end service flow characteristic information and a transmit-end fragment reassembly identifier; and the transmitting module is specifically configured to transmit the transmit-end delay measurement information to the MCP; or the DCP is a data collecting point managing a downstream TLP;

the acquiring module is specifically configured to acquire the receive-end delay measurement information, where the receive-end delay measurement information further includes: receive-end service flow characteristic information and a receive-end fragment reassembly identifier; and the transmitting module is specifically configured to transmit the receive-end delay measurement information to the MCP, so that the MCP determines, according to the transmit-end service flow characteristic information, the transmit-end fragment reassembly identifier, the receive-end service flow characteristic information, and the receive-end fragment reassembly identifier, that the transmit-end timestamp information and the receive-end timestamp information are timestamp information corresponding to a same service flow.

According to another aspect, an embodiment of the present application provides a TLP, including:

an identifying module, configured to identify a service flow according to service flow characteristic information, and determine whether the service flow is a target service flow;

a timestamp acquiring module, configured to: if the service flow is the target service flow, add a delay measurement flag to a data packet of the service flow, and acquire data packet delay measurement information corresponding to the delay measurement flag; and a determining module, configured to determine delay measurement information, where the delay measurement information includes: timestamp information, a service flow identifier, a TLP identifier, so that after acquiring the delay measurement information, the DCP transmits the delay measurement information to an MCP.

Optionally, in the TLP, the adding a delay measurement flag to a data packet of the service flow, and acquiring data packet delay measurement information corresponding to the delay measurement flag by the timestamp acquiring module includes:

a timestamp acquiring module of an upstream TLP is specifically configured to add a delay measurement flag to the data packet of the target service flow, and acquire transmit-end delay measurement information of the data packet corresponding to the delay measurement flag, where the transmit-end delay measurement information includes: transmit-end timestamp information, a service flow identifier, and a TLP identifier, so that after acquiring the transmit-end delay measurement information, a DCP managing the upstream TLP transmits the transmit-end delay measurement information to the MCP; and a timestamp acquiring module of a downstream TLP is specifically configured to: when the identifying module identifies the data packet to which the delay measurement flag is added, acquire receive-end delay measurement information of the data packet corresponding to the delay measurement flag, where the receive-end delay measurement information includes: receive-end timestamp information, a service flow identifier, and a TLP identifier, so that after acquiring the receive-end delay measurement information, a DCP managing the downstream TLP transmits the receive-end delay measurement information to the MCP.

Optionally, the TLP is an upstream TLP; the TLP further includes:

a time synchronization module, specifically configured to: before the timestamp acquiring module of the upstream TLP adds the delay measurement flag to the data packet of the target service flow, perform time synchronization with the DCP managing the upstream TLP by using the NTP or an IEEE 1588v2 clock; or the TLP is a downstream TLP, and the time synchronization module is specifically configured to: before the identifying module of the downstream TLP identifies the data packet to which the delay measurement flag is added, perform time synchronization with the DCP managing the downstream TLP by using the NTP or an IEEE 1588v2 clock; and the TLP further includes a measurement period identifier acquiring module, configured to: acquire a measurement period identifier corresponding to the delay measurement flag by using a measurement period identifier acquiring module of the upstream TLP, so that after acquiring the measurement period identifier, the DCP managing the upstream TLP transmits the measurement period identifier to the MCP; and acquire the measurement period identifier corresponding to the delay measurement flag and start time of each measurement period by using a measurement period identifier acquiring module of the downstream TLP, so that after acquiring the start time and the measurement period identifier, the DCP managing the downstream TLP performs matching between the start time and the measurement period identifier, and then transmits the measurement period identifier to the MCP.

Optionally, the TLP further includes:

a transmitting module, specifically configured to transmit a measurement packet to the downstream TLP by using a transmitting module of the upstream TLP, where the measurement packet includes: transmit-end timestamp information; and a receiving module, specifically configured to: acquire the measurement packet by using a receiving module of the downstream TLP, generate arrival timestamp information of the measurement packet, and transmit the measurement packet and the arrival timestamp information to the DCP managing the downstream TLP, so that the DCP determines whether the arrival timestamp information and receive-end timestamp information pertain to a preset duration range, and if the arrival timestamp information and the receive-end timestamp information pertain to the preset duration range, determines that the transmit-end timestamp information and the receive-end timestamp information pertain to a same data packet and transmits a result of the determining to the MCP.

Optionally, in the TLP, the transmit-end delay measurement information acquired by the timestamp acquiring module of the upstream TLP further includes: transmit-end service flow characteristic information and a transmit-end fragment reassembly identifier; and the receive-end delay measurement information acquired by the timestamp acquiring module of the downstream TLP further includes: receive-end service flow characteristic information and a receive-end fragment reassembly identifier;

so that the DCP managing the upstream TLP acquires the transmit-end delay measurement information and transmits the transmit-end delay measurement information to the MCP, and the DCP managing the downstream TLP acquires the receive-end delay measurement information and transmits the receive-end delay measurement information to the MCP; therefore, the MCP determines, according to the transmit-end service flow characteristic information, the transmit-end fragment reassembly identifier, the receive-end service flow characteristic information, and the receive-end fragment reassembly identifier, that the transmit-end timestamp information and the receive-end timestamp information are timestamp information corresponding to a same service flow.

Optionally, in the TLP, the adding, by the timestamp acquiring module of the upstream TLP, a delay measurement flag to the data packet of the target service flow includes:

adding, by the timestamp acquiring module, a delay measurement flag in a reserved bit of TOS or a reserved bit of Flags in an IP header of the data packet.

Optionally, in the TLP, the identifying module is specifically configured to identify the service flow according to information about at least two tuples in a quintuple.

According to still another aspect, an embodiment of the present application provides an MCP, including:

a receiving module, configured to receive transmit-end delay measurement information transmitted by a DCP corresponding to an upstream TLP and receive-end delay measurement information transmitted by a DCP corresponding to a downstream TLP, where the transmit-end delay measurement information includes: transmit-end timestamp information, a service flow identifier, and a TLP identifier; and the receive-end delay measurement information includes: receive-end timestamp information, a service flow identifier, and a TLP identifier; and a determining module, configured to determine details about a single network delay according to the transmit-end delay measurement information and the receive-end delay measurement information.

Optionally, the MCP further includes:

a time synchronization module, configured to perform synchronization with the DCP by using the NTP or an IEEE 1588v2 clock;

the receiving module includes:

a first receiving unit, configured to receive the transmit-end delay measurement information transmitted by the DCP corresponding to the upstream TLP and the receive-end delay measurement information transmitted by the DCP corresponding to the downstream TLP, where the transmit-end delay measurement information includes: transmit-end timestamp information, a service flow identifier, and a TLP identifier; and the receive-end delay measurement information includes: receive-end timestamp information, a service flow identifier, and a TLP identifier; and a second receiving unit, configured to receive a measurement period identifier transmitted by the DCP managing the upstream TLP, and receive a measurement period identifier transmitted by the DCP managing the downstream TLP;

the determining module further includes:

a first matching unit, specifically configured to determine, according to the measurement period identifier transmitted by the DCP managing the upstream TLP and the measurement period identifier transmitted by the DCP managing the downstream TLP, whether the transmit-end delay measurement information and the receive-end delay measurement information pertain to a same measurement period; and a determining module, specifically configured to: if the transmit-end delay measurement information and the receive-end delay measurement information pertain to a same measurement period, determine the details about a single network delay according to the transmit-end delay measurement information and the receive-end delay measurement information.

Optionally, in the MCP, the receiving module is specifically configured to receive the transmit-end delay measurement information transmitted by the DCP corresponding to the upstream TLP, and the receive-end delay measurement information that is determined as pertaining to a same data packet as the transmit-end delay measurement information and is transmitted by the DCP corresponding to the downstream TLP; and the determining module is specifically configured to determine the details about a single network delay according to the transmit-end delay measurement information and the receive-end delay measurement information.

Optionally, in the MCP, the receiving module is specifically configured to: receive the transmit-end delay measurement information transmitted by the DCP corresponding to the upstream TLP, where the transmit-end delay measurement information includes: the timestamp information, the service flow identifier, the TLP identifier, transmit-end service flow characteristic information, and a transmit-end fragment reassembly identifier; and receive the receive-end delay measurement information transmitted by the DCP corresponding to the downstream TLP, where the receive-end delay measurement information includes: the timestamp information, the service flow identifier, the TLP identifier, receive-end service flow characteristic information, and a receive-end fragment reassembly identifier; and the determining module includes:

a second matching unit, configured to determine, according to the transmit-end service flow characteristic information, the transmit-end fragment reassembly identifier, the receive-end service flow characteristic information, and the receive-end fragment reassembly identifier, whether the transmit-end timestamp information and the receive-end timestamp information are timestamp information corresponding to a same service flow; and a determining unit, specifically configured to: if the transmit-end timestamp information and the receive-end timestamp information are timestamp information corresponding to a same service flow, determine the details about a single network delay according to the transmit-end delay measurement information and the receive-end delay measurement information.

An embodiment of the present application provides a system for measuring a network delay, including: the foregoing DCP, the foregoing TLP, and the foregoing MCP.

With the method, the apparatus, and the system for measuring a network delay according to the embodiments of the present application, a DCP acquires delay measurement information obtained by directly measuring a service flow by at least one TLP, and transmits the delay measurement information to an MCP uniformly, so that the MCP determines details about a network delay according to related information in the delay measurement information, thereby implementing direct delay measurement of the service flow.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

Figure 1:
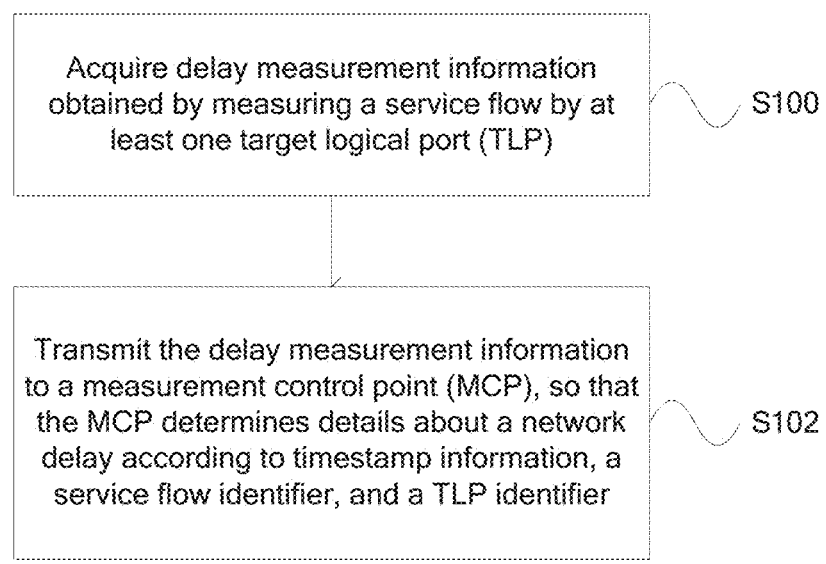
FIG. 1 is a flowchart of Embodiment 1 of a method for measuring a network delay according to the present application.

FIG. 1 is a flowchart of Embodiment 1 of a method for measuring a network delay according to the present application. As illustrated in FIG. 1, the method according to this embodiment may include:

S100. Acquire delay measurement information obtained by measuring a service flow by at least one target logical port (TLP).

Specifically, the delay measurement information includes: timestamp information, a service flow identifier, and a TLP identifier.

A data collecting point (Data Collecting Point, hereinafter referred to as DCP) acquires delay measurement information obtained by measuring a service flow by at least one target logical port (Target Logical Port, hereinafter referred to as TLP). The TLP corresponds to an upstream transmit-end ingress of a network or a downstream receive-end egress of a network. DCPs corresponding to the TLP are deployed on an upstream transmit device and a downstream receive device, to read delay measurement information of the TLP on the device each of the DCPs locates. That is, when the TLP corresponds to an upstream transmit-end ingress of a network, a DCP corresponding to the TLP is deployed on an upstream transmit device corresponding to the upstream transmit-end ingress of the network; and when the TLP corresponds to a downstream receive-end egress of a network, a DCP corresponding to the TLP is deployed on a downstream receiving device corresponding to the downstream receive-end egress of the network.

When a service flow enters a network, a unique service flow identifier is generated for the service flow correspondingly. Optionally, a service flow ID may be used as an identifier of the service flow. One service flow identifier uniquely corresponds to one service flow. Therefore, when a scenario of point to multipoint transmission or multipoint to multipoint transmission of the service flow occurs on the network, that is, when the DCPs on the upstream transmitting device and downstream receiving device acquire delay measurement information obtained by measuring the service flow by multiple TLPs, it may be determined, according to the service flow identifier, whether related delay measurement information pertains to a same service flow.

Each piece of delay measurement information includes a corresponding TLP identifier. In this case, during acquisition of the delay measurement information obtained by measuring the service flow by the multiple TLPs, a measurement control point (Measurement Control Point, hereinafter referred to as MCP) may differentiate delay measurement information from different TLPs according to TLP identifiers.

S102. Transmit the delay measurement information to a measurement control point (MCP), so that the MCP determines details about a network delay according to the timestamp information, the service flow identifier, and the TLP identifier.

Specifically, a process of acquiring and transmitting the delay measurement information by the DCP is implemented by a network device-based management network. For each node device on the network, in addition to a service port for transmitting a service flow, a management port is also configured, the node devices may form the management network through the management ports. In this way, a transmission path of the delay measurement information may be used for out-band transmission over the management network, or a transmission path of the delay measurement information may be used for in-band transmission along a same path as a transmission path of a target service flow through the service port. Optionally, the management network may employ a virtual private network (Virtual Private Network, hereinafter referred to as VPN), a digital communication network (Data Communication Network, hereinafter referred to as DCN), or a public network with reachable IP.

With the method for measuring a network delay according to this embodiment, a DCP acquires delay measurement information obtained by measuring a service flow by at least one TLP, thereby implementing direct measurement of the service flow; and the DCP transmits the delay measurement information to an MCP uniformly, so that the MCP determines details about a network delay according to related information in the delay measurement information. In addition, when multiple TLPs separately measure the service flow and obtain respective data packet measurement information, the delay measurement information is transmitted, so that the MCP uniformly determines details about a delay of the service flow according to the delay measurement information. In this way, accurate delay measurement of a service flow is directly implemented in a scenario of point to point transmission or point to multipoint transmission on the network, and details about a real delay of the service flow is reflected.

Based on Embodiment 1 of the method for measuring a network delay according to the present application, in Embodiment 2 of the method for measuring a network delay according to the present application, the acquiring, by the DCP, delay measurement information obtained by measuring a service flow by at least one TLP includes:

acquiring, by a data collecting point (DCP) managing an upstream TLP, transmit-end delay measurement information obtained by measuring a transmitted service flow by at least one upstream TLP; and acquiring, by a DCP managing a downstream TLP, receive-end delay measurement information obtained by measuring a received service flow by at least one downstream TLP.

The transmitting the delay measurement information to an MCP includes:

transmitting, by the DCP managing the upstream TLP, the transmit-end delay measurement information to the MCP, where the transmit-end delay measurement information includes: transmit-end timestamp information, a service flow identifier, and a TLP identifier.

Specifically, according to this embodiment, DCPs are deployed at upstream transmit ends, and the DCPs are used to manage TLPs at the upstream transmit ends. After an upstream TLP identifies a transmitted service flow and adds a delay measurement flag to a data packet of the service flow, where a time point when the delay measurement flag is added is transmit-end timestamp information, the upstream TLP generates transmit-end delay measurement information, and the DCPs acquire the transmit-end delay measurement information of the upstream TLP. The transmit-end delay measurement information includes: the transmit-end timestamp information, the service flow identifier, and the TLP identifier that are collected by at least one TLP at the upstream transmit ends.

The transmitting the delay measurement information to an MCP further includes:

transmitting, by the DCP managing the downstream TLP, the receive-end delay measurement information to the MCP, where the receive-end delay measurement information includes: receive-end timestamp information, a service flow identifier, and a TLP identifier.

Specifically, similar to the foregoing description, according to this embodiment, DCPs are deployed at downstream receive ends, the DCPs are used to manage TLPs at the downstream receive ends. First, a downstream TLP identifies a service flow. If the service flow is a target service flow, when identifying the data packet with the delay measurement flag, the downstream TLP uses the time point as receive-end timestamp information, and generates the receive-end delay measurement information. A DCP acquires the receive-end delay measurement information obtained by measuring a received service flow by the downstream TLP. The receive-end delay measurement information includes: the receive-end timestamp information, the service flow identifier, and the TLP identifier that are collected by at least one TLP at the downstream receive ends. It should be noted that concepts of upstream and downstream are defined with respect to a transmission direction of a service flow on the network. With respect to different service flows, a same TLP may be either an upstream TLP or a downstream TLP.

In one aspect, based on Embodiment 2 of the method for measuring a network delay according to the present application, a method in Embodiment 3 of the method for measuring a network delay according to the present application further includes:

when a measurement period ends, acquiring, by the DCP managing the upstream TLP, a measurement period identifier, and transmitting the measurement period identifier to the MCP; and acquiring, by the DCP managing the downstream TLP, start time of the measurement period; where if a difference between the start time and the timestamp information is less than or equal to a preset duration, the receive-end delay measurement information pertains to measurement information corresponding to the measurement period identifier; and if the difference between the start time and the timestamp information is greater than the preset duration, the measurement period identifier is increased by 1, the timestamp information pertains to a next measurement period, and the measurement period identifier is transmitted to the MCP. Optionally, the preset duration is ⅔ of a duration of the measurement period.

Specifically, the measurement period identifier may be directly acquired by the upstream TLP and the downstream TLP by using the delay measurement information, alternatively, the measurement period identifier may be acquired by the DCP managing the upstream TLP and the DCP managing the downstream TLP according to the time point when the transmit-end delay measurement information is acquired and the time point when the receive-end delay measurement information is acquired after the DCP managing the upstream TLP and the DCP managing the downstream TLP read the transmit-end delay measurement information and the receive-end delay measurement information.

With respect to each measurement period, either a DCP or a TLP corresponding to the DCP may generate a corresponding measurement period identifier. The measurement period identifier may be obtained through the DCP by using the following formula:

$$\text{Measurement period identifier} = \text{Global quantity of seconds} / \text{Duration of the measurement period}$$

It should be noted that time synchronization is performed between the upstream TLP and the DCP managing the upstream TLP, between the downstream TLP and the DCP managing the downstream TLP, and between the DCPs by using the Network Time Protocol (Network Time Protocol, hereinafter referred to as NTP) or an IEEE 1588v2 clock; the global quantity of seconds may be a time point when delay measurement information is generated by a TLP, or may be a time point when a DCP reads the delay measurement information; and the measurement period identifier is an integer rounded from a result of dividing the global quantity of seconds by the duration of the measurement period. For example, assuming that the duration of each measurement period is 1s, when the time point when the upstream TLP adds a delay measurement flag to a data packet within a measurement period is 10s, the measurement period identifier of the measurement period is calculated according to the foregoing formula, that is, 10s/1s=10; assuming that the duration of each measurement period is 2s, when the time point when the upstream TLP adds a delay measurement flag to a data packet within a measurement period is 7s, 7/2=3.5, and the measurement period identifier is 3.

The upstream TLP takes the measurement period as a unit, and selects a data packet in a service flow with each measurement period and adds a delay measurement flag to the selected data packet. Therefore, a measurement period identifier is generated for each measurement period. For example, assuming that the upstream TLP adds a delay measurement flag to a data packet A, the upstream TLP generates transmit-end delay measurement information and generates a corresponding measurement period identifier, where the measurement period identifier is 10, to ensure that the MCP perform delay calculation according to transmit-end timestamp information and receive-end timestamp information that are corresponding to the data packet A. When the measurement period ends, the DCP managing the upstream TLP acquires the transmit-end timestamp information and the measurement period identifier generated by the upstream TLP, and transmits the transmit-end timestamp information and the measurement period identifier (that is, 10) to the MCP. After the data packet A is transmitted over the network and arrives at a receive end, the downstream TLP identifies within a measurement period the data packet A to which the delay measurement flag is added, generates receive-end delay measurement information and a measurement period identifier, and transmits the receive-end delay measurement information and the measurement period identifier to the DCP managing the downstream TLP. The DCP managing the downstream TLP determines that the measurement period identifier is 10 if the difference between the start time and the timestamp information is less than or equal to a preset duration, and transmits the receive-end delay measurement information and the measurement period identifier 10 to the MCP; and if the difference between the start time and the timestamp information is greater than the preset duration, the DCP increases the measurement period identifier by 1, that is, the measurement period identifier is 11, and then transmits the receive-end delay measurement information and the new measurement period identifier 11 to the MCP. The MCP associates, according to the measurement period identifier 11, the receive-end delay measurement information with the transmit-end delay measurement information with the measurement period identifier 11 that is transmitted by the DCP managing the upstream TLP.

Optionally, to ensure that the upstream TLP and the downstream TLP generate the measurement period identifier based on a same time, the DCP managing the upstream TLP performs time synchronization with the upstream TLP by using the NTP or the IEEE 1588 v2 clock, and the DCP managing the downstream TLP performs time synchronization with the downstream TLP by using the NTP or an IEEE 1588v2 clock. In addition, the DCP managing the upstream TLP also performs time synchronization with the DCP managing the downstream TLP by using the NTP or an IEEE 1588v2 clock.

Specifically, the Network Time Protocol (Network Time Protocol, hereinafter referred to as NTP) and an IEEE 1588v2 clock are both external synchronization tools. The NTP is a commonly used network synchronization tool. A synchronization deviation of the NTP is 1 ms to 50 ms, and the NTP is capable of meeting synchronization requirements of the method for measuring a network delay according to this embodiment. An IEEE 1588v2 clock is a high-precision clock by using the IEEE 1588v2 protocol. The time synchronization method involved in the present application calibrates local time of the upstream TLP and the DCP managing the upstream TLP, local time of the downstream TLP and the DCP managing the downstream TLP, and local time between the DCP managing the upstream TLP and the DCP managing the downstream TLP based on a common time reference (the NTP or an IEEE 1588v2 clock). Optionally, boundary points (start time points of various periods) of various periods are defined by using the NTP or an IEEE 1588v2 clock, that is, a start time point of each measurement period of the upstream TLP and the DCP managing the upstream TLP are aligned with a start time point of each measurement period of the downstream TLP and the DCP managing the downstream TLP. With respect to a network in which an IEEE 1588v2 clock has been deployed, the method for measuring a network delay according to this embodiment optionally employs the IEEE 1588v2 clock to perform time synchronization.

Figure 2:
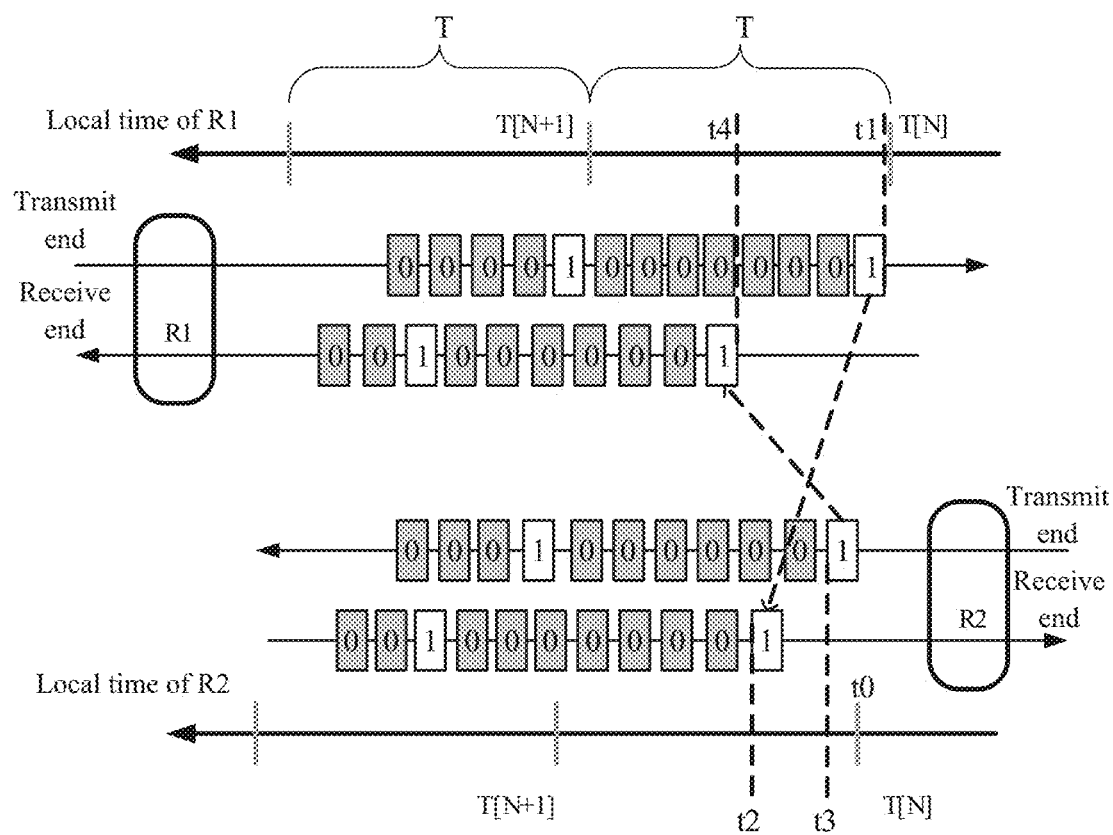
FIG. 2 is a schematic flowchart of implementation of Embodiment 3 of a method for measuring a network delay according to the present application.

FIG. 2 is a schematic flowchart of implementation of Embodiment 3 of a method for measuring a network delay according to the present application. With reference to FIG. 2, the following describes in detail the method for measuring a network delay according to Embodiment 3 of the present application.

As illustrated in FIGS. 2, R1 and R2 are network node devices, TLPs and corresponding DCPs are deployed on R1 and R2, and an MCP is deployed on any network node device on the network. Optionally, the MCP is deployed on a node device with powerful functions. Referring to FIG. 2, with respect to R1 and R2, two service flows that are in opposite directions may be used for delay measurement.

Considering that R1 and R2 both have its local time, and corresponding time axes are respectively a local time of R1 and a local time of R2, time and period synchronization is achieved between R1 and R2 by using an external time synchronization tool or the like. T[N] and T[N+1] represent respective measurement period identifiers corresponding to internals of two neighboring measurement periods.

As can be seen from FIG. 2, the two time axes of the local times of R1 and R2 and boundary points of the measurement periods such as T[N] and T[N+1] are basically aligned by using the NTP or an IEEE 1588v2 clock. A deviation of the two local time axes is caused by an error of the network itself, or precision of the NTP or the IEEE 1588v2 clock.

Within a measurement period T[N] with a same measurement period identifier at two ends of R1 and R2, at the TLPs at transmit ends and receive ends of R1 and R2, when the measurement period (including a range of the first T/n of the measurement period) starts, one-way delay measurement is oppositely initiated for a data packet of a service flow. Within each measurement period, a delay measurement flag is added to a data packet in only one target service flow.

At the upstream transmit ends of R1 and R2, the TLPs add a delay measurement flag to a data packet, and obtains local transmit timestamps t1 and t3. At the downstream receive ends of R1 and R2, within the corresponding measurement period T[N], the TLPs detects a data packet with the delay measurement flag. In this case, the downstream TLPs may acquire local receive timestamps t2 and t4, and a TLP may report delay measurement information containing timestamp information to a DCP managing the TLP; or when each measurement period ends, the DCPs managing the TLPs read the delay measurement information.

All the delay measurement information includes: timestamp information, a service flow identifier, and a TLP identifier, and carries the same period identifier T[N], where the service flow identifier and the TLP identifier reflect information in a receive or transmit direction. The delay measurement information is read by the DCP and then transmitted by the DCP to the MCP, and the MCP performs matching and calculation according to T[N].

A two-way delay may be taken as a sum of two one-way delays, as represented by the following formula:

Two-way delay=$(t2-t1)+(t4-t3)=(t4-t1)-(t3-t2)$

This formula also indicates that two times of one-way delays measurement do not necessarily require coupling of a time sequence. Therefore, two one-way delays measurements may be separately initiated and performed.

If precise time synchronization is deployed on the network, one-way delay $1d(R1{\rightarrow}R2)=t2-t1$, $1d(R2{\rightarrow}R1)=t4-t3$. With respect to selection of a measurement period T, assuming that the measurement period is T, a sum of a transmission delay and an out-of-order delay of a service flow is D, and a synchronization error between measurement periods of a transmit end and a receive end is $\Delta$, then the measurement period T satisfies the following two conditions: 1. $(2*\Delta-D)<T/3$; 2. $(2*\Delta+D)<2*T/3$.

With respect to period pertaining rules of the measurement period identifier and the receive-end timestamp information, assuming that a transmit-end timestamp within the $N^{th}$ period is TX, if a service flow exists within 100 ms starting from start time of each measurement period, then a delay measurement flag is added to the first data packet of the service flow, and an upstream TLP records a timestamp Time_TX[N] at that time, and acquires a measurement period identifier N; otherwise, a delay measurement packet is not marked within this period.

With respect to determining of the measurement period to which a receive end pertains, assuming that within the $N^{th}$ period, the receive end receives a data packet to which a delay measurement flag is added, a downstream TLP records a local timestamp Time_Rx. If the downstream TLP acquires the Time$_{13}$ Rx when the period ends, a DCP managing the downstream TLP performs the following calculation:

Time_RX−Time[N] (Time[N] is start time of the current period. The DCP performs synchronization with the managed TLP by using the NTP or an IEEE 1588v2 clock. Therefore, the DCP may directly acquire the start time of the period on the local time of the DCP).

If a calculation result is greater than 2T/3 (T is a duration of the period), the timestamp pertains to a next period (the measurement period identifier is increased by 1 because a data packet arrives ahead of time due to a synchronization error); otherwise, the timestamp information pertains to the current period.

If reading is performed at 2T/3 of the period, an obtained Time_RX is a receive timestamp Time_RX[N] of the period N.

If $\Delta$<100 ms, and the transmission delay plus the out-of-order delay D is less than 200 ms, the selected delay measurement period T is greater than 1s.

With the method for measuring a network delay according to this embodiment of the present application, when a measurement period ends, a DCP managing an upstream TLP acquires a measurement period identifier and transmit-end delay measurement information, and transmits the measurement period identifier to an MCP; a DCP of a downstream TLP acquires a measurement period identifier and receive-end delay measurement information, and the DCP determines the acquired measurement period identifier, and transmits the determined measurement period identifier and the receive-end delay measurement information to the MCP, so that the MCP associates, according to an upstream measurement period identifier and a downstream measurement period identifier, the transmit-end delay measurement information and the receive-end delay measurement information that pertain to a same period of a same service flow, thereby directly and accurately measuring details about a delay of a service flow.

In another aspect, based on Embodiment 2 of the method for measuring a network delay according to the present application, a method for measuring a network delay according to Embodiment 4 of the present application further includes:

acquiring, by the DCP managing the downstream TLP, a measurement packet transmitted by the upstream TLP and received by the at least one downstream TLP, and arrival timestamp information of the measurement packet, which is generated when the measurement packet arrives at the downstream TLP, where the measurement packet includes: transmit-end timestamp information.

Specifically, with respect to a network in which network receive-end and network transmit-end devices, a delay of a service flow is measured by taking a measurement period as a unit, but a receive-end measurement period and a transmit-end measurement period do not pass a network for performing time synchronization by using a time synchronization tool, the upstream TLP adds a delay measurement flag to one data packet within each measurement period, and generates transmit-end delay measurement information, where the transmit-end measurement information includes timestamp information, a service flow identifier, and a TLP identifier. The upstream TLP transmits a measurement packet including transmit-end timestamp information to the downstream TLP at the receive end. The DCP managing the downstream TLP compares arrival timestamp information of the measurement packet with the receive-end delay measurement information, to ensure that the transmit-end delay measurement information and the receive-end delay measurement information pertain to a same measurement period.

The DCP managing the downstream TLP performs matching and identification to determine whether the arrival timestamp information and the receive-end timestamp information pertain to a preset duration range; if the arrival timestamp information and the receive-end timestamp information pertain to the preset duration range, the DCP managing the downstream TLP determines that the transmit-end timestamp information in the measurement packet and the receive-end timestamp information generated by the downstream TLP pertain to a same measurement period, that is, pertaining to a same data packet (because within each period, a delay measurement flag is added to only one data packet), and transmits a result of the determining to the MCP.

Optionally, the DCP managing the downstream TLP may transmit the transmit-end timestamp information and the receive-end timestamp information that pertain to a same measurement period to the MCP, and the MCP performs calculation. Alternatively, the DCP may directly determine details about a data packet delay within the period according to the transmit-end timestamp information and the receive-end timestamp information that pertain to a same measurement period, and then transmits calculated details about the delay to the MCP.

Figure 3:
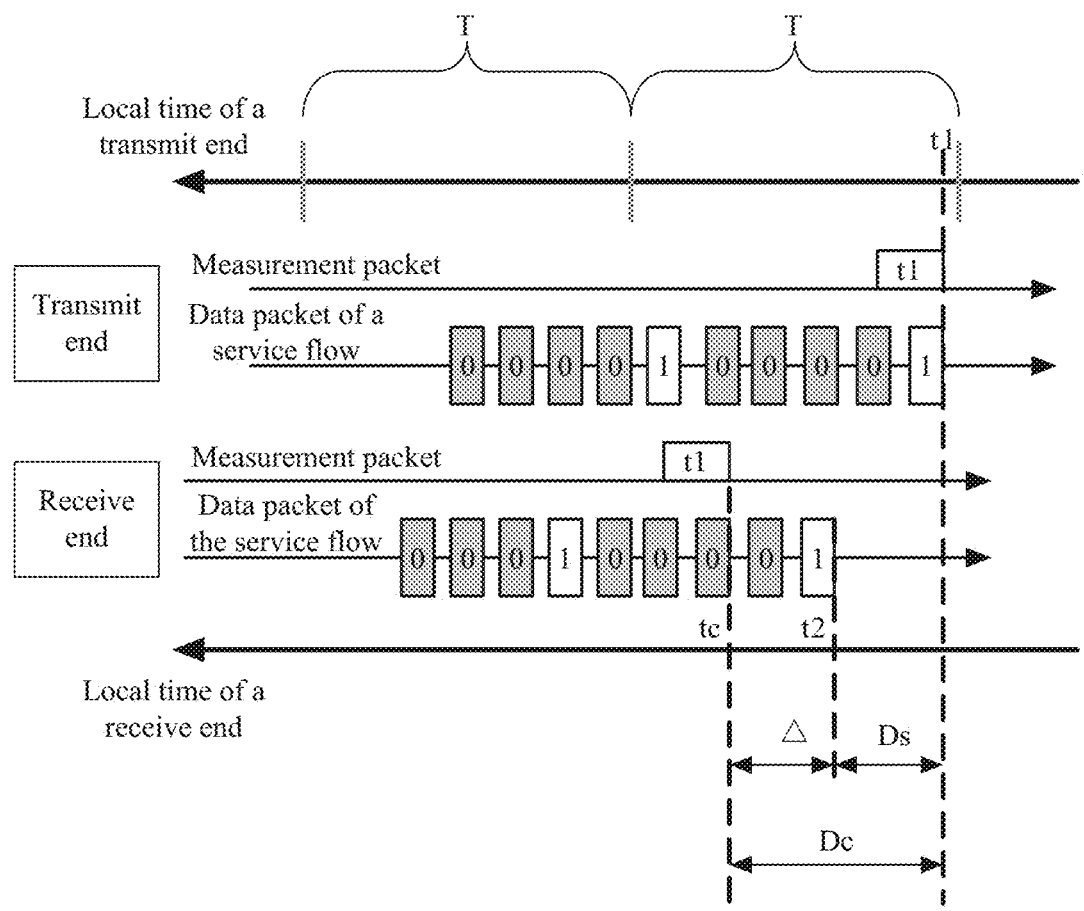
FIG. 3 is a schematic flowchart of implementation of Embodiment 4 of a method for measuring a network delay according to the present application.

Specifically, FIG. 3 is a schematic flowchart of implementation of Embodiment 4 of a method for measuring a network delay according to the present application. As illustrated in FIG. 3, when a data packet to which a delay measurement flag is added is transmitted over a network and arrives at a receive end, there is a delay Ds; and when a measurement packet carrying transmit-end timestamp information and transmitted by an upstream TLP arrives at the receive end, there is also a delay Dc. A delay difference is defined by using the following formula:

Delay difference $\Delta = |Ds - Dc|$.

Referring to FIG. 3, assuming that each of measurement periods of an upstream TLP of a transmit end and a downstream TLP of a receive end is T, the upstream TLP of the transmit end (TX) adds a delay measurement flag to a data packet A of a service flow at time t1, to obtain local transmit-end timestamp information t1, generates a measurement packet including the transmit-end timestamp information t1, and transmits the measurement packet to the downstream TLP of the receive end (RX). After a delay Ds, due to possible disorder, the data packet A may arrive first, or the measurement packet may arrive first. When the data packet A arrives at the downstream TLP of the receive end first, the downstream TLP of the receive end obtains receive-end timestamp information t2 of the service flow. After a delay Dc, the measurement packet carrying t1 arrives at the receive end; the receive end obtains arrival timestamp information tc of the measurement packet. When the measurement packet arrives at the downstream TLP first, the same principle applies.

For the matching and identification, the DCP managing the downstream TLP sets $|tc-t2|<$delay difference $\Delta$; and during an interval period T for measuring the delay, a delay measurement flag is added to a data packet of the service flow only at the beginning of a measurement period when $T \geq$ delay difference $\Delta$. Therefore, the DCP managing the downstream TLP performs matching and identification as follows:

During a single measurement, the DCP managing the downstream TLP first acquires the receive-end timestamp information t2, and takes the receive-end timestamp information t2 as a reference. In a time range of t2 plus delay difference $\Delta$ or t2 minus delay difference $\Delta$, the DCP managing the downstream TLP acquires the measurement packet at time tc, and then the transmit-end timestamp information t1 may match the receive-end timestamp information t2; that is, the transmit-end timestamp information and the receive-end timestamp information pertain to a same data packet within a same measurement period. Alternatively, the DCP managing the downstream TLP first acquires the measurement packet, and takes the arrival timestamp information tc of the measurement packet as a reference. In a time frame of tc plus delay difference $\Delta$ or tc minus delay difference $\Delta$, the DCP managing the downstream TLP acquires the receive-end timestamp information t2, and then the transmit-end timestamp information t1 may match the receive-end timestamp information t2; that is, the transmit-end timestamp information and the receive-end timestamp information pertain to a same data packet within a same measurement period.

During a periodic measurement, during each periodic interval for measuring a delay (the time interval during which the upstream TLP adds a delay measurement flag to the data packet of the service flow is T), the upstream TLP adds the delay measurement flag only to one data packet of the service flow. On an actual network, jitter of Ds and Dc occurs and Ds and Dc are prolonged, but the jitter and prolonging are limited, there is a maximum value of the delay difference $\Delta$, that is, $\Delta$ (MAX). As long as the measurement period interval $T > 2 \times \Delta(MAX) +$ minimum safe time interval, it may be determined that during each sampling interval, the t2 timestamp matches the protocol packet corresponding to the t1.

Assuming that on the network, $\Delta(MAX) = 500$ ms, considering 100 ms safe processing time, then $T > 2 \times 500 + 100 = 1.1S$, and a periodic measurement may be implemented.

With the method for measuring a network delay according to this embodiment of the present application, a DCP managing a downstream TLP acquires a measurement packet that is transmitted by an upstream TLP and received by at least one downstream TLP; the DCP managing the downstream TLP performs matching and identification to determine whether transmit-end timestamp information and receive-end timestamp information pertain to a preset duration range; and if the transmit-end timestamp information and the receive-end timestamp information pertain to the preset duration range, the DCP managing the downstream TLP determines that the transmit-end timestamp information and the receive-end timestamp information pertain to a same measurement period, and transmits a result of the determining to an MCP, thereby implementing direct and accurate measurement of details about a delay of a service flow.

In still another aspect, based on Embodiment 2 of the method for measuring a network delay according to the present application, in a method for measuring a network delay according to Embodiment 5 of the present application, the transmit-end delay measurement information further includes: transmit-end service flow characteristic information and a transmit-end fragment reassembly identifier; and the receive-end delay measurement information further includes: receive-end service flow characteristic information and a receive-end fragment reassembly identifier, so that the MCP determines, according to the transmit-end service flow characteristic information, the transmit-end fragment reassembly identifier, the receive-end service flow characteristic information, and the receive-end fragment reassembly identifier, that the transmit-end timestamp information and the receive-end timestamp information are timestamp information corresponding to a same service flow.

Specifically, during a process for measuring a delay of a service flow, it is critical to determine that transmit-end timestamp information and receive-end timestamp information are acquired respectively at a transmit end and a receive end of a network from a same data packet that is in the service flow and to which a delay measurement flag is added, there is a delay that the data packet goes from the transmit-end to the receive-end of the network. With respect to a data packet of the service flow, service characteristic information and a fragment reassembly identifier included in the data packet may uniquely identify the data packet. The service flow characteristic information is a quintuple in an IP header and information in a type of service TOS (Type of Service, hereinafter referred to as TOS), where the quintuple refers to a source IP address, a destination IP address, a protocol type, a source protocol port number, and a destination protocol port number in the IP header. During a transmission process of the data packet, an oversized data packet is always divided into multiple sub-data packets and then the sub-data packets are transmitted. With respect to a fragmented data packet, a fragment reassembly identifier pertaining to each sub-data packet is the same. After receiving the fragmented sub-data packets, the receive end may reassemble the sub-data packets into the original data packet according to the fragment reassembly identifiers of the sub-data packets.

Accordingly, when a service flow is identified by the upstream TLP, the upstream TLP adds a delay measurement flag to a data packet A of the service flow, and generates transmit-end delay measurement information, which includes transmit-end timestamp information, a service flow identifier, a TLP identifier, transmit-end service flow characteristic information, and a transmit-end fragment reassembly identifier. The DCP managing the upstream TLP acquires the transmit-end delay measurement information, and transmits the transmit-end delay measurement information to the MCP. When the downstream TLP identifies the data packet A with the delay measurement flag, the downstream TLP generates receive-end delay measurement information, which includes receive-end timestamp information, a service flow identifier, a TLP identifier, receive-end service flow characteristic information, and a receive-end fragment reassembly identifier, and the DCP managing the downstream TLP acquires the receive-end delay measurement information, and transmits the receive-end delay measurement information to the MCP. The MCP may determine, according to the transmit-end service flow characteristic information, the transmit-end fragment reassembly identifier, the receive-end service flow characteristic information, and the receive-end fragment reassembly identifier, that the transmit-end timestamp information and the receive-end timestamp information are respectively acquired by the transmit end and the receive end of the network after a same data packet that is in the service flow and to which a delay measurement flag is added is transmitted, there is a delay that the data packet goes from the transmit-end to the receive-end of the network, that is, matching between the transmit-end delay measurement information and the receive-end delay measurement information is implemented. Therefore, the MCP performs delay measurement according to the successfully matched transmit-end delay measurement information and receive-end delay measurement information.

Figure 4:
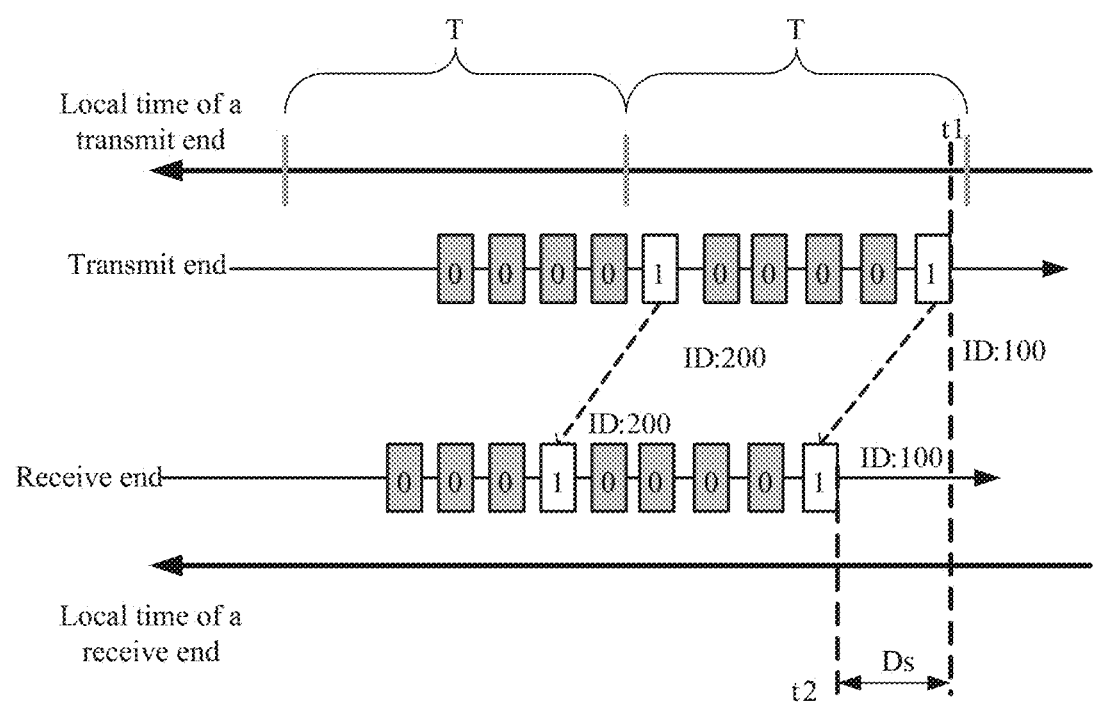
FIG. 4 is a schematic flowchart of implementation of Embodiment 5 of a method for measuring a network delay according to the present application.

FIG. 4 is a schematic flowchart of implementation of Embodiment 5 of a method for measuring a network delay according to the present application. With reference to FIG. 4, the following describes in detail the method for measuring a network delay according to Embodiment 5 of the present application.

During delay measurement, it is critical to determine that transmit-end timestamp information and receive-end timestamp information are acquired when a same data packet that is in a service flow and to which a delay measurement flag is added passes a network. In this embodiment, a quintuple of a data packet (a source IP address, a destination IP address, a protocol type, a source protocol port number, and a destination protocol port number) and a fragment reassembly identifier (a fragment reassembly ID) are used to perform matching. A matching principle of Embodiment 5 of the method for measuring a network delay according to the present application is as follows:

On an IP network, for a same VPN (on one VPN, a data packet has non-overlapping address space), a service flow may be determined by using a quintuple of an IP packet. Within a certain period of time (one ID cycle), a fragment reassembly ID (not fragmented) of a data packet of the service flow determined by a quintuple is unique. Therefore, for a data packet of the service flow in a measurement domain (which may include multiple different service flows), the data packet of the service flow may be uniquely determined by using a quintuple of the packet +a fragment reassembly ID at a transmit end and a receive end. (For a same service flow, a fragment reassembly ID of each data packet is different; for different service flows, each service flow has a different quintuple.)

DCPs at the transmit end and receive end and managing TLPs, read delay measurement information, service flow characteristic information (a quintuple) and a fragment reassembly identifier (a fragment reassembly ID), thereby matching timestamp information of data packets of a same service flow.

For a fragmented data packet on the network, the DCPs managing the TLPs read timestamp information of a first received data packet. (Disorder and a delay of the fragmented data packet are often shorter than a measurement period, and a cycling time of a fragment reassembly ID at a host side is longer than the measurement period.)

During the measurement implementing process illustrated in FIG. 4, for the data packet of the service flow determined by using the quintuple, the fragment reassembly ID is 100 at the transmit end, and is also 100 at the receive end. According to this feature of being unchanged, it may be determined that the timestamp information acquired at the two ends is a measurement result of a same data packet.

In addition, optionally, at the receive end, if the delay measurement information carries a local period identifier (time synchronization is not required), an order of the delay measurement information and matching of two-way delay measurement may be further determined.

With the method for measuring a network delay according to this embodiment of the present application, transmit-end delay measurement information obtained by an upstream TLP by measuring is acquired by a DCP managing the upstream TLP, and transmitted to an MCP. A DCP managing a downstream TLP acquires receive-end delay measurement information obtained by the downstream TLP by measuring and transmits the receive-end delay measurement information to the MCP. Because the transmit-end delay measurement information further includes transmit-end service flow characteristic information and a transmit-end fragment reassembly identifier; and the receive-end delay measurement information further includes receive-end service flow characteristic information and a receive-end fragment reassembly identifier, the MCP may be enabled to determine, according to the transmit-end service flow characteristic information, the transmit-end fragment reassembly identifier, the receive-end service flow characteristic information, and the receive-end fragment reassembly identifier, that transmit-end timestamp information and receive-end timestamp information are respectively acquired at a transmit end and a receive end of a network from a same data packet that is in a service flow and to which a delay measurement flag is added, there is a delay that the data packet goes from the transit end to the receive end, thereby performing fast and accurate measurement of the delay.

The foregoing embodiment describes a specific method performed by the DCP according to the method for measuring a network delay in the present application; the following describes in detail the specific method performed by the TLP according to the method for measuring a network delay in the present application.

Figure 5:
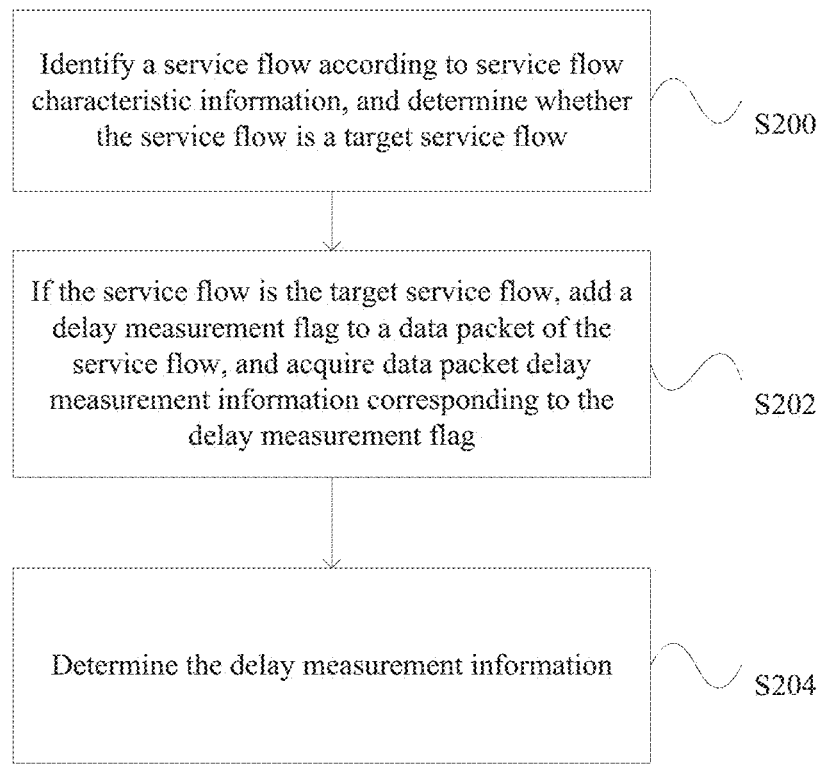
FIG. 5 is a flowchart of Embodiment 6 of a method for measuring a network delay according to the present application.

FIG. 5 is a flowchart of Embodiment 6 of a method for measuring a network delay according to the present application. As illustrated in FIG. 5, the method according to this embodiment may include:

S200. Identify a service flow according to service flow characteristic information, and determine whether the service flow is a target service flow.

Specifically, TLPs are deployed at upstream transmit ends and downstream receive ends first. Optionally, an upstream TLP and a downstream TLP may be simultaneously deployed on user sides or network sides of a transmit end and a receive end. Each service flow has specific service flow characteristic information. The service flow characteristic information has been described in detail in Embodiment 5 of the method for measuring a network delay, and is not described herein again. Therefore, when a service flow enters the network, an upstream transmit port TLP first identifies the service flow according to service flow characteristic information. The identification process is performing matching between preset service flow characteristic information and packet header information of the service flow. If the preset service flow characteristic information matches the packet header information of the service flow, the upstream transmit port TLP determines that the service flow is a target service flow. When a scenario of point to multipoint transmission or multipoint to multipoint transmission of the service flow occurs on the network, regardless of a specific path of the service flow, whether data packets at the upstream transmit ends and the downstream receive ends pertain to the same service flow may be determined according to service flow characteristic information of the service flow.

S202. If the service flow is the target service flow, add a delay measurement flag to a data packet of the service flow, and acquire data packet delay measurement information corresponding to the delay measurement flag.

Specifically, the TLP adds a delay measurement flag to a data packet of the service flow, and generates delay measurement information, where the delay measurement information includes: timestamp information, a service flow identifier, and a TLP identifier. The timestamp information is a time point when the delay measurement flag is added by the TLP. The service flow identifier and the TLP identifier have been described in detail in Embodiment 1 of the method for measuring a network delay, and are not described herein again.

S204. Determine the delay measurement information.

Specifically, the TLP generates the delay measurement information, so that after acquiring the delay measurement information, a DCP transmits the delay measurement information to an MCP; therefore, the MCP determines details about a delay according to the delay measurement information.

With the method for measuring a network delay according to this embodiment of the present application, a TLP identifies a service flow according to service flow characteristic information, and determines whether the service flow is a target service flow. If the service flow is the target service flow, the TLP adds a delay measurement flag to a data packet of the service flow, acquires delay measurement information of the data packet, where the delay measurement information of the data packet corresponds to the delay measurement flag, and determines the delay measurement information, so that after receiving the delay measurement information, the DCP transmits the delay measurement information to an MCP; therefore, the MCP determines details about a delay according to the delay measurement information. This implements direct delay measurement of the data packet of the service flow, and improves accuracy and truthfulness of the delay measurement.

Based on Embodiment 6 of the method for measuring a network delay, optionally, in the method according to Embodiment 7 of the method for measuring a network delay according to the present application, the adding a delay measurement flag to a data packet of the service flow, and acquiring data packet delay measurement information corresponding to the delay measurement flag includes:

adding, by an upstream TLP, a delay measurement flag to the data packet of the target service flow, and acquiring transmit-end delay measurement information of the data packet corresponding to the delay measurement flag, where the transmit-end delay measurement information includes: transmit-end timestamp information, a service flow identifier, and a TLP identifier, so that after acquiring the transmit-end delay measurement information, a DCP managing the upstream TLP transmits the transmit-end delay measurement information to an MCP; and when identifying the data packet to which the delay measurement flag is added, acquiring, by a downstream TLP, receive-end delay measurement information of the data packet corresponding to the delay measurement flag, where the receive-end delay measurement information includes: receive-end timestamp information, a service flow identifier, and a TLP identifier, so that after acquiring the receive-end delay measurement information, a DCP managing the downstream TLP transmits the receive-end delay measurement information to the MCP.

Optionally, the delay measurement flag is added in a reserved bit of TOS or a reserved bit of Flags in an IP header of the data packet.

Specifically, a range that may be specified for the delay measurement flag is a total of six bits in two fields TOS and Flags of the IP header of the data packet, that is, bits 3 to 7 of TOS, and bit 0 of Flags. Specifically, in different specific networks, the last bits (bits 3 to 7) of TOS are generally not used, especially bits 6 and 7, which are seldom used. Therefore, these unused bits in the IP header may be used to add the Flag. In an IP header of IPv4, bit 0 of Flags is the unique currently reserved bit in the IP header. In a common IP header, this bit may be used to add a flag to a data packet.

During specific implementation, the identifying a service flow according to service flow characteristic information may include:

identifying the service flow according to information about at least two tuples in a quintuple.

Specifically, a quintuple refers to a source IP address or its IP address prefix, a destination IP address or its IP address prefix, a protocol type, a source protocol port number, and a destination protocol port number that are in an IP header. In addition to a quintuple, information may be added to the TOS field in the IP header to specify the service flow characteristic information. The fields may be all specified, so that the measurement of the service flow is fine. Alternatively, the fields may be partially specified, for example, at least information about two tuples: the source IP address and the destination IP address; or the source IP address prefix and the destination IP address prefix; or the source IP address or its IP address prefix, the destination IP address or its IP address prefix, and type of service (Type of Service, hereinafter referred to as TOS) information.

In one aspect, based on Embodiment 7 of the method for measuring a network delay according to the present application, a method for measuring a network delay according to Embodiment 8 of the present application further includes:

before adding the delay measurement flag to the data packet of the target service flow, performing, by the upstream TLP, time synchronization with the DCP managing the upstream TLP by using the NTP or an IEEE 1588v2 clock; and before identifying the data packet to which the delay measurement flag is added, performing, by the downstream TLP, time synchronization with the DCP managing the downstream TLP by using the NTP or an IEEE 1588v2 clock;

Specifically, time synchronization methods and principles have been described in detail in Embodiment 3 of the method for measuring a network delay according to the present application, and are not described herein again. Referring to FIG. 2, by taking a measurement period as a unit, the upstream TLP adds a delay measurement flag to a data packet of the service flow within an interval of each measurement period and generates transmit-end delay measurement information and a measurement period identifier; the downstream TLP identifies the data packet to which the delay measurement flag is added by taking the measurement period as a unit and generates receive-end delay measurement information and a measurement period identifier. During delay measurement, it is critical to determine that the transmit-end timestamp information and the receive-end timestamp information are respectively acquired by the upstream TLP and the downstream TLP after a same data packet to which the delay measurement flag is added is transmitted over the network. In this embodiment, before delay measurement is performed at the upstream TLP and the downstream TLP, an external time synchronization tool, that is, the NTP or an IEEE 1588v2 clock, may be separately deployed at the upstream TLP and the downstream TLP, to implement time synchronization between the upstream TLP and the DCP managing the upstream TLP, and time synchronization between the downstream TLP and the DCP managing the downstream TLP. Optionally, the DCP managing the upstream TLP and the DCP managing the downstream TLP are also deployed with the external time synchronization tool, that is, the NTP or an IEEE 1588v2 clock, to ensure time synchronization between the TLP and the DCP, and between the DCPs. This ensures that within each measurement period, the transmit-end measurement period identifier generated by the upstream TLP matches the receive-end measurement period identifier generated by the downstream TLP, and therefore ensures that the transmit-end delay measurement information and the receive-end delay measurement information that have the same measurement period identifier match, so that the MCP accurately determines details about a delay.

The adding a delay measurement flag to a data packet of the service flow, and acquiring data packet delay measurement information corresponding to the delay measurement flag further includes:

adding, by the upstream TLP, a delay measurement flag to the data packet of the target service flow, acquiring a measurement period identifier corresponding to the delay measurement flag, so that after acquiring the measurement period identifier, the DCP managing the upstream TLP transmits information about the measurement period identifier to the MCP. The upstream TLP and the downstream TLP both employ the NTP or an IEEE 1588v2 clock to perform time synchronization with the DCP managing the upstream TLP and the DCP managing the downstream TLP. Therefore, after the DCP managing the upstream TLP and the DCP managing the downstream TLP read the transmit-end delay measurement information and the receive-end delay measurement information, the DCP managing the upstream TLP acquires a corresponding measurement period identifier according to the read transmit-end delay measurement information, and the DCP managing the downstream TLP acquires a corresponding measurement period identifier according to the read receive-end delay measurement information. The two measurement period identifiers pertain to a same measurement period and are consistent for the data packet to which the delay measurement flag is added.

Specifically, if the upstream TLP identifies the target service flow within 100 ms starting from start time of each measurement period, the upstream TLP adds a delay measurement flag to the first data packet of the service flow, records timestamp information t1 at that time, and acquires a measurement period identifier T[N], as shown in FIG. 2. If the upstream TLP fails to identify the target service flow, a delay measurement flag is not added to the data packet within this measurement period.

acquiring, by the downstream TLP, the start time of each measurement period within the measurement period, and when identifying, within each measurement period, the data packet to which the delay measurement flag is added, acquiring the measurement period identifier corresponding to the delay measurement flag, so that after acquiring the start time and the measurement period identifier, the DCP managing the downstream TLP transmits information about the measurement period identifier to the MCP.

Specifically, referring to FIG. 2, assuming that a measurement period is T, the downstream TLP records, starting from start time of the $N^{th}$ measurement period, start time t0 of the measurement period. If a data packet with a delay measurement flag is identified within the measurement period, the downstream TLP records timestamp information t3 at that time, and generates a measurement period identifier M and receive-end delay measurement information. When the $N^{th}$ measurement period ends, the DCP managing the downstream TLP acquires the receive-end delay measurement information, the measurement period identifier T[N], and the start time t0, where the receive-end delay measurement information includes: the timestamp information t3, a service flow identifier, and a TLP identifier. The DCP managing the downstream TLP performs calculation on the timestamp information t3 and the start time t0. If t3−t0<2T/3, the timestamp information t3 pertains to the $N^{th}$ measurement period; if t3−t0≥2T/3, the timestamp information t3 pertains to the $N+1^{th}$ measurement period. In this case, the DCP managing the downstream TLP increases the period identifier T[N] by 1 to obtain T[N+1]. In this way, in cases of out-of-order data packets due to a time synchronization error, after receiving the receive-end delay measurement information and the measurement period identifier that are transmitted by the DCP managing the downstream TLP, the MPC is still capable of determining, according to the measurement period, that the transmit-end timestamp information and the receive-end timestamp information are timestamp information corresponding to a same data packet, thereby accurately and directly implementing delay measurement.

In addition, in the method for measuring a network delay according to this embodiment, within each measurement period, a TLP identifies a data packet of a service flow, and adds a delay measurement flag to the data packet within the measurement period. Optionally, the TLP adds a delay measurement flag to only one data packet.

With the method for measuring a network delay according to this embodiment of the present application, before adding a delay measurement flag to a data packet of a target service flow, an upstream TLP performs time synchronization with a DCP managing the upstream TLP by using the NTP or an IEEE 1588v2 clock. Before identifying the data packet to which the delay measurement flag is added, a downstream TLP performs time synchronization with a DCP managing the downstream TLP by using the NTP or an IEEE 1588v2 clock, ensuring time synchronization between the upstream TLP and the downstream TLP, thereby ensuring that within a same period, a measurement period identifier generated by the upstream TLP is consistent with a measurement period identifier generated by the downstream TLP. In this way, an MCP determines, according to the same measurement period identifier, that transmit-end timestamp information and receive-end timestamp information are timestamp information corresponding to a same data packet. In addition, in cases of out-of-order data packets due to a time synchronization error, the downstream TLP acquires start time of each measurement period within the measurement period, and acquires a measurement period identifier corresponding to the delay measurement flag when identifying the data packet to which the delay measurement flag is added within each measurement period, so that after the DCP managing the downstream TLP acquires the start time and the measurement period identifier, the DCP determines, according to the start time and the receive-end timestamp information, a correct measurement period identifier, and transmits the correct measurement period identifier to the MCP; therefore, the MCP accurately determines details about a delay.

In another aspect, based on Embodiment 7 of the method for measuring a network delay according to the present application, a method for measuring a network delay according to Embodiment 9 of the present application further includes:

transmitting, by the upstream TLP, a measurement packet to the downstream TLP, where the measurement packet includes: transmit-end timestamp information;

receiving, by a receiving module of the downstream TLP, the measurement packet, generating arrival timestamp information of the measurement packet, and transmitting the measurement packet and the arrival timestamp information to the DCP managing the downstream TLP, so that the DCP determines whether the arrival timestamp information and the receive-end timestamp information pertain to a preset duration range, and if the arrival timestamp information and the receive-end timestamp information pertain to the preset duration range, determines that the transmit-end timestamp information and the receive-end timestamp information pertain to the same measurement period, and transmits a result of the determining to an MCP.

Specifically, referring to FIG. 3, the upstream TLP performs delay measurement on the service flow by taking the measurement period T as a unit. However, time synchronization is not performed for the measurement periods of the upstream TLP and the downstream TLP by using a time synchronization tool. To ensure that transmit-end delay measurement information and receive-end delay measurement information pertain to a same measurement period, in this embodiment, when the upstream TLP generates transmit-end delay measurement information by taking a measurement period as a unit, where the transmit-end delay measurement information includes timestamp information, a service flow identifier, and a TLP identifier, and when the DCP managing the upstream TLP acquires the transmit-end delay measurement information, the upstream TLP generates a measurement packet including transmit-end timestamp information t1, and transmits the measurement packet to the downstream TLP at the receive end; the downstream TLP generates receive-end delay measurement information within a measurement period and receives the measurement packet; the DCP managing the downstream TLP acquires the receive-end delay measurement information and the measurement packet, and compares the measurement packet with the receive-end delay measurement information. Specific comparison methods and technical solutions have been described in Embodiment 4 of the method for measuring a network delay, and are not described herein again.

In addition, in the method for measuring a network delay according to this embodiment, a TLP identifies a data packet of a service flow, and adds a delay measurement flag to the data packet within a measurement period. Optionally, within each measurement period, the TLP adds a delay measurement flag to only one data packet.

With the method for measuring a network delay according to this embodiment of the present application, an upstream TLP transmits a measurement packet to a downstream TLP, where the measurement packet includes transmit-end timestamp information; the downstream TLP transmits the received measurement packet to a DCP, so that the DCP determines whether transmit-end timestamp information and receive-end timestamp information pertain to a preset duration range; if the transmit-end timestamp information and the receive-end timestamp information pertain to the preset duration range, the DCP determines that the transmit-end timestamp information and the receive-end timestamp information pertain to a same measurement period, and transmits a result of the determining to an MCP, thereby ensuring that transmit-end delay measurement information and receive-end delay measurement information pertain to a same measurement period, and implementing direct and accurate delay measurement of a service flow.

In still another aspect, based on Embodiment 7 of the method for measuring a network delay according to the present application, a method for measuring a network delay according to Embodiment 10 of the present application further includes:

The transmit-end delay measurement information further includes: transmit-end service flow characteristic information and a transmit-end fragment reassembly identifier; and the receive-end delay measurement information further includes: receive-end service flow characteristic information and a receive-end fragment reassembly identifier;

so that the DCP managing the upstream TLP acquires the transmit-end delay measurement information and transmits the transmit-end delay measurement information to the MCP, and the DCP managing the downstream TLP acquires the receive-end delay measurement information and transmits the receive-end delay measurement information to the MCP; therefore, the MCP determines, according to the transmit-end service flow characteristic information, the transmit-end fragment reassembly identifier, the receive-end service flow characteristic information, and the receive-end fragment reassembly identifier, whether the transmit-end timestamp information and the receive-end timestamp information are timestamp information corresponding to a same service flow.

Specifically, referring to FIG. 4, during network delay measurement, it is critical to determine that transmit-end timestamp information and receive-end timestamp information are respectively acquired by the upstream TLP and the downstream TLP after a same data packet to which a delay measurement flag is added is transmitted over the network. In this embodiment, accordingly, when a service flow is identified by the upstream TLP, the upstream TLP adds a delay measurement flag 1 to a data packet A of the target service flow. The transmit-end delay measurement information generated by the upstream TLP includes transmit-end timestamp information, a service flow identifier, a TLP identifier, transmit-end service flow characteristic information, and a transmit-end fragment reassembly identifier. The DCP managing the upstream TLP acquires the transmit-end delay measurement information, and transmits the transmit-end delay measurement information to the MCP. In addition, because a timestamp is not added to a data packet based on a period in this embodiment, the TLP according to this embodiment may add delay measurement flags densely to a data packet of a service flow. When the downstream TLP identifies the data packet A with the delay measurement flag, the downstream TLP generates receive-end delay measurement information, which includes receive-end timestamp information, a service flow identifier, a TLP identifier, receive-end service flow characteristic information, and a receive-end fragment reassembly identifier, and the DCP managing the downstream TLP acquires the receive-end delay measurement information, and transmits the receive-end delay measurement information to the MCP. The MCP may determine, according to the transmit-end service flow characteristic information, the transmit-end fragment reassembly identifier, the receive-end service flow characteristic information, and the receive-end fragment reassembly identifier, that the transmit-end timestamp information and the receive-end timestamp information are respectively acquired by the transmit end and the receive end of the network after a same data packet of the service flow to which a delay measurement flag is added is transmitted, there is a delay that the data packet goes from the transit end to the receive end. In this way, the MCP performs delay measurement according to the matched transmit-end delay measurement information and receive-end delay measurement information. The service flow characteristic information and the fragment reassembly identifier have been described in Embodiment 5 of the method for measuring a network delay, and are not described herein again.

With the method for measuring a network delay according to this embodiment of the present application, after identifying and performing delay measurement on a data packet of a target service flow, an upstream TLP records transmit-end service flow characteristic information and a transmit-end fragment reassembly identifier, and the upstream TLP generates transmit-end delay measurement information; the transmit-end delay measurement information according to this embodiment of the present application not only includes transmit-end timestamp information, a service flow identifier, and a TLP identifier, but also includes the transmit-end service flow characteristic information and the transmit-end fragment reassembly identifier, so that a DCP managing the upstream TLP acquires the transmit-end delay measurement information and transmits the transmit-end delay measurement information to an MCP; and a downstream TLP performs similar operations, so that a DCP managing the downstream TLP acquires the receive-end delay measurement information and transmits the receive-end delay measurement information to the MCP; therefore, the MCP implements matching between the transmit-end delay measurement information and the receive-end delay measurement information according to the transmit-end service flow characteristic information, the transmit-end fragment reassembly identifier, the receive-end service flow characteristic information, and the receive-end fragment reassembly identifier. In this way, accuracy of direct delay measurement is ensured.

The following describes in detail the method performed by the MCP in the method for measuring a network delay according to the present application.

Figure 6:
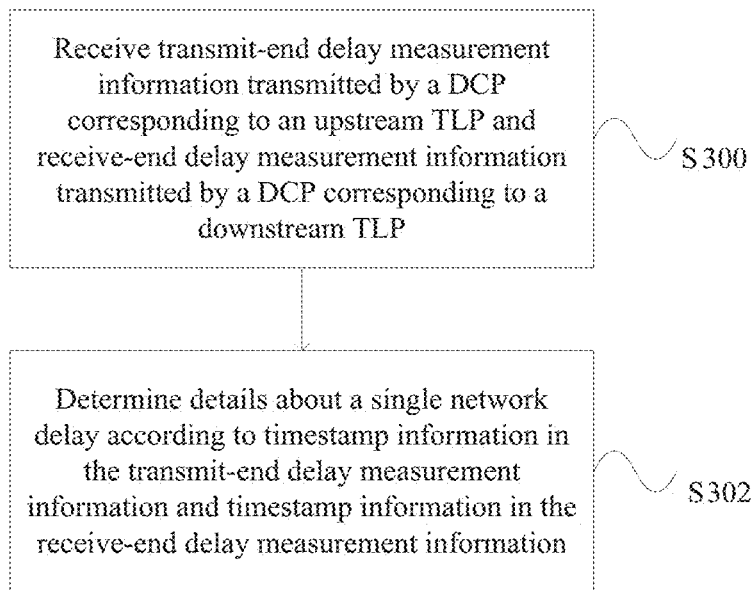
FIG. 6 is a flowchart of Embodiment 11 of a method for measuring a network delay according to the present application.

FIG. 6 is a flowchart of Embodiment 11 of a method for measuring a network delay according to the present application. As illustrated in FIG. 6, the method according to this embodiment may include the following steps:

S300. Receive transmit-end delay measurement information transmitted by a DCP corresponding to an upstream TLP and receive-end delay measurement information transmitted by a DCP corresponding to a downstream TLP.

Specifically, the transmit-end delay measurement information includes: transmit-end timestamp information, a service flow identifier, and a TLP identifier, and the receive-end delay measurement information includes: receive-end timestamp information, a service flow identifier, and a TLP identifier.

S302. Determine details about a single network delay according to the transmit-end delay measurement information and the receive-end delay measurement information.

Specifically, an MCP performs, according to the transmit-end delay measurement information and the receive-end delay measurement information, delay calculation on the transmit-end timestamp information and the receive-end timestamp information pertaining to a same data packet of a same service flow. In addition, in the method for measuring a network delay according to this embodiment of the present application, the MCP may be deployed on any network element node on an entire network. Optionally, the MCP may be deployed on a network element node with powerful functions. Further, the MCP, the DCPs, and the TLPs are connected based on a management network.

With the method for measuring a network delay according to this embodiment of the present application, an MCP receives transmit-end delay measurement information transmitted by a DCP corresponding to an upstream TLP, and receive-end delay measurement information transmitted by a DCP corresponding to a downstream TLP, and the MCP determines details about a single network delay according to the transmit-end delay measurement information and the receive-end delay measurement information, thereby implementing direct and accurate delay measurement of a service flow.

In one aspect, based on Embodiment 11 of the method for measuring a network delay according to the present application, a method for measuring a network delay according to Embodiment 12 of the present application further includes:

receiving, by an MCP, a measurement period identifier transmitted by the DCP managing the upstream TLP, receiving, by the MCP, a measurement period identifier transmitted by the DCP managing the downstream TLP, determining, by the MCP according to the measurement period identifier transmitted by the DCP managing the upstream TLP and the measurement period identifier transmitted by the DCP managing the downstream TLP, whether the transmit-end delay measurement information and the receive-end delay measurement information pertain to a same measurement period, and if the transmit-end delay measurement information and the receive-end delay measurement information pertain to a same measurement period, determining, by the MCP, details about a single network delay according to the transmit-end delay measurement information and the receive-end delay measurement information.

Specifically, when delay measurement is performed on a target service flow, optionally the MCP maintains a measurement data summary table for the target service flow. Table 1 is a measurement data summary table for the target service flow according to this embodiment. With reference to Table 1, the following describes how to determine details about a network delay according to this embodiment.

TABLE 1

Measurement data summary table for the target service flow

| Data packet | Service flow identifier | Data type | TLPs (n TLPs) on the left side | | | TLPs (m TLPs) on the right side | | | Data arrival flag |
|---|---|---|---|---|---|---|---|---|---|
| | | | TLP (1) | ... | TLP (n) | TLP (1) | ... | TLP (m) | |
| N | Forward service flow identifier | Timestamp | Transmit-end timestamp information | Invalid | Invalid | Invalid | ... | Receive-end timestamp information | All arrive |
| | Backward service flow identifier | Timestamp | Receive-end timestamp information | Invalid | Invalid | Transmit-end timestamp information | Invalid | Invalid | All arrive |
| N − 1 | Forward service flow identifier | Timestamp | Transmit-end timestamp information | Invalid | Invalid | Not arrive | Not arrive | Not arrive | Arrive in the upstream |
| | Backward service flow identifier | Timestamp | Receive-end timestamp information | Invalid | Invalid | Invalid | Invalid | Invalid | Arrive in the downstream |
| ... | ... | ... | ... | ... | ... | ... | ... | ... | ... |

With respect to Table 1, the measurement data summary table for the target service flow, it should be noted that, in Table 1, concepts of "TLPs on the left side" and "TLPs on the right side" are defined by using the network as a boundary. One network side is defined as the left side, and TLPs deployed on ports on the left side are the TLPs on the left side; and the TLPs on the right side are defined accordingly. During the process of measuring a network delay according to this embodiment of the present application, it is possible that two target service flows that are in opposite directions exist simultaneously. In this case, the MCP may define one of the target service flows as a forward service flow and define the other target service flow as a backward service flow according to source IP addresses or their IP address prefixes and destination IP addresses or their IP address prefixes in quintuples of the two target service flows. For example, a range of a network covers all devices and subnetworks including a left-side port device to a right-side port device. Assuming that a target service flow A enters the network from TLPs on the left-side port device and leaves the network from TLPs on the right-side port device, and a target service flow B enters the network from the TLPs on the right-side port device and leaves the network from the TLPs on the left-side port device. With respect to the target service flow A, the left-side port device is a transmit-end device, and the left-side TLPs are upstream transmit ends; with respect to the target service flow B, the left-side port device is a receive-end device, and the left-side TLPs are downstream receive ends. Therefore, during delay measurement for two target service flows that are in opposite directions based on a same TLP, in Table 1, the measurement data summary table for the target service flow, which is maintained by the MCP, within each period, the MCP maintains a data entry for the forward service flow and a data entry for the backward service flow, thereby implementing a function of simultaneously performing delay measurement on two service flows that are in opposite directions.

The DCP reads delay measurement information of the TLPs and transmits the delay measurement information to the MCP. First, the MCP may find, according to the service flow identifier, or optionally by using a target service flow ID as the service flow identifier, a corresponding measurement data summary table for the target service flow; and then the MCP fills data into the corresponding measurement data summary table for the target service flow according to the service flow identifier, the measurement period identifier and the TLP identifier. In this embodiment, in Table 1, the measurement period identifier may uniquely determine that transmit-end delay measurement information and receive-end delay measurement information pertain to a same data packet, that is, with respect to entries of the data packet in Table 1, one measurement period identifier corresponds to one data packet.

With respect to the process of receiving the delay measurement information and maintaining Table 1 by the MCP, it should be noted that, because delay measurement is directed to data packets, during a transmission process of a data packet, there is only one piece of transmit-end timestamp information generated by an upstream TLP and one piece of receive-end timestamp information generated by a downstream TLP. Therefore, referring to Table 1, when the MCP receives a piece of delay measurement information and updates the delay measurement information to data entries of one TLP of the left-side TLPs, other TLP data entries of the left-side TLPs of the data packet are set as invalid by the MCP; and with respect to the right-side TLPs, the MCP performs similar operations.

Referring to Table 1, assuming that one service flow is a forward service flow, each data entry of a data packet of the forward service flow corresponds to a data arrival flag in the measurement data summary table for the target service flow. When delay measurement information of the left-side TLPs and the right-side TLPs of a data packet corresponding to each measurement period identifier does not arrive, the MCP sets the data arrival flag within the measurement period as "Not arrive". For example, in Table 1, in data entries corresponding to the forward service flow with the measurement period identifier N−1, among the left-side TLPs, the MCP receives transmit-end delay measurement information obtained by the first TLP by measurement and transmitted by the DCP managing the upstream TLP, but delay measurement information in the right-side TLPs does not arrive. In this case, the MCP sets an arrival flag of a corresponding data entry as "Arrive in the upstream". After the MCP receives receive-end delay measurement information transmitted by the DCP managing the downstream TLP, the MCP updates Table 1, and fills receive-end timestamp information carried in the receive-end delay measurement information to a corresponding TLP data entry, and sets an arrival flag of a corresponding data entry as "All arrive".

After the MCP detects that in a measurement period identifier, a data arrival flag of a data entry corresponding to a forward service flow identifier or a backward service flow identifier is set to "All arrive", the MCP performs the delay calculation according to the corresponding transmit-end timestamp information and the corresponding receive-end timestamp information. A specific formula is as follows:

Delay=Receive-end timestamp information−Transmit-end timestamp information

That is, a difference between a time point when an upstream TLP adds a delay measurement flag to a data packet and a time point when the data packet is identified by a downstream TLP.

Referring to Table 1, with respect to one measurement period identifier, two-way delay measurement may be performed on a forward service flow and a backward service flow simultaneously. In this case, the MCP performs experimental calculation according to transmit-end timestamp information and receive-end timestamp information corresponding to the forward service flow, and transmit-end timestamp information and receive-end timestamp information corresponding to the backward service flow. A specific formula is as follows:

Delay=(Receive-end timestamp information corresponding to a backward service flow−Transmit-end timestamp information corresponding to a forward service flow)−(Transmit-end timestamp information corresponding to the backward service flow−Receive-end timestamp information corresponding to the forward service flow)

Figure 7:
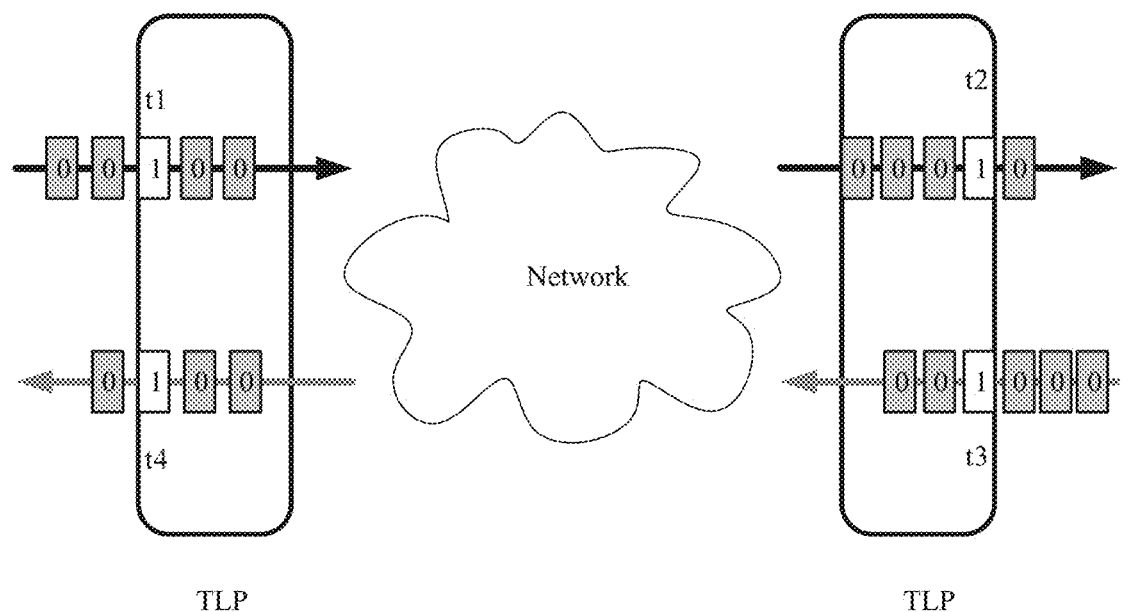
FIG. 7 is a schematic diagram of two-way delay measurement in Embodiment 12 of a method for measuring a network delay according to the present application.

FIG. 7 is a schematic diagram of two-way delay measurement in Embodiment 12 of a method for measuring a network delay according to the present application. Referring to FIG. 7, the foregoing principles and methods for calculating a two-way delay are further described.

As illustrated in FIG. 7, assuming that the service flow at the upper part in FIG. 7 is a forward service flow, the TLP on the left side of the network adds a delay measurement flag 1 to a data packet, and records time t1. Therefore, transmit-end timestamp information corresponding to the forward service flow is t1. When identifying the data packet with the delay measurement flag 1, the TLP on the right side records time t2, that is, receive-end timestamp information corresponding to the forward service flow is t2. The TLP on the left side and the TLP on the right side respectively generate transmit-end delay measurement information and receive-end delay measurement information, and a DCP managing the TLP on the left side (the TLP on the left side is an upstream TLP for the forward service flow) and a DCP managing the TLP on the right side respectively read the transmit-end delay measurement information and the receive-end delay measurement information, and transmit the transmit-end delay measurement information and the receive-end delay measurement information to the MCP. Likewise, with respect to a backward service flow, the MCP receives transmit-end timestamp information t3 and receive-end timestamp information t4. The MCP calculates a delay of a data packet of the forward service flow as t2−t1, and calculates a delay of a data packet of the backward service flow as t4−t3. In this case, a two-way delay is (t2−t1)+(t4−t3), that is, (t4−t1)−(t3−t2).

With the method for measuring a network delay according to this embodiment, first, an MCP performs time synchronization with DCPs by using an external time synchronization tool; then the MCP receives delay measurement information transmitted by the DCPs corresponding to an upstream TLP and a downstream TLP, where the delay measurement information includes transmit-end delay measurement information and receive-end delay measurement information; the MCP records and maintains a measurement data summary table for a target service flow, the transmit-end delay measurement information of the upstream TLP at the transmit end and the receive-end delay measurement information of the downstream TLP at the receive end; and the MCP performs, according to the measurement data summary table for the target service flow by taking each measurement period as a unit, delay calculation for the transmit-end delay measurement information and the receive-end measurement information, thereby directly and accurately determining details about a delay of a service flow on the network.

In another aspect, based on Embodiment 11 of the method for measuring a network delay according to the present application, a method for measuring a network delay according to Embodiment 13 of the present application further includes:

receiving, by an MCP, the transmit-end delay measurement information transmitted by the DCP corresponding to the upstream TLP, receiving, by the MCP, the receive-end delay measurement information that is determined as pertaining to a same measurement period as the transmit-end delay measurement information and is transmitted by the DCP corresponding to the downstream TLP, and determining, by the MCP, details about a single network delay according to the transmit-end delay measurement information and the receive-end delay measurement information.

Specifically, with respect to a network on which no external time synchronization tool is employed, to ensure that transmit-end delay measurement information and receive-end delay measurement information pertain to a same measurement period, it needs to ensure that the transmit-end delay measurement information and the receive-end delay measurement information pertain to a same data packet. With the methods according to Embodiments 4 and 9 of the method for measuring a network delay according to the present application, an upstream TLP, a downstream TLP, and a DCP managing the downstream TLP performs matching between transmit-end delay measurement information and receive-end delay measurement information, and the DCP transmits the transmit-end delay measurement information and the receive-end delay measurement information that are consistent to an MCP. The MCP according to this embodiment also maintains Table 1. According to the transmit-end delay measurement information and the receive-end delay measurement information that are consistent, by referring to FIG. 1, the MCP updates the transmit-end delay measurement information and the receive-end delay measurement information to data entries of a corresponding data packet in Table 1. It should be noted that, in Table 1 maintained by the MCP in this embodiment, the DCP may transmit the transmit-end delay measurement information and the receive-end delay measurement information that are consistent to the MCP, the MCP may update the transmit-end delay measurement information and the receive-end delay measurement information to data entries of the corresponding data packet, and the MCP determines details about a delay. The DCP may also determine details about a delay according to the transmit-end delay measurement information and receive-end delay measurement information that are consistent, and then transmits the determined details about a delay to the MCP. In this case, the MCP directly receives the details about a delay.

Data entries corresponding to a data packet are determined according to transmit-end delay measurement information and receive-end delay measurement information that are consistent, and then the MCP performs delay calculation. The specific calculation methods and formulas have been described in detail in Embodiment 12 of the method for measuring a network delay according to the present application, and are not described herein again.

With the method for measuring a network delay according to this embodiment, an MCP receives transmit-end delay measurement information transmitted by a DCP corresponding to an upstream TLP, the MCP receives receive-end delay measurement information that is determined as pertaining to a same measurement period as the transmit-end delay measurement information and is transmitted by a DCP corresponding to a downstream TLP, and the MCP measures details about a single network delay according to the transmit-end delay measurement information and the receive-end delay measurement information, thereby ensuring that the MCP accurately and directly measures details about a network flow delay without a time synchronization tool.

In still another aspect, based on Embodiment 11 of the method for measuring a network delay according to the present application, a method for measuring a network delay according to Embodiment 14 of the present application further includes:

receiving, by an MCP, the transmit-end delay measurement information transmitted by the DCP corresponding to the upstream TLP, where the transmit-end delay measurement information includes: the timestamp information, the service flow identifier, the TLP identifier, transmit-end service flow characteristic information, and a transmit-end fragment reassembly identifier;

receiving, by the MCP, the receive-end delay measurement information transmitted by the DCP corresponding to the downstream TLP, where the receive-end delay measurement information includes: the timestamp information, the service flow identifier, the TLP identifier, receive-end service flow characteristic information, and a receive-end fragment reassembly identifier; and determining, by the MCP according to the transmit-end service flow characteristic information, the transmit-end fragment reassembly identifier, the receive-end service flow characteristic information, and the receive-end fragment reassembly identifier, whether the transmit-end timestamp information and the receive-end timestamp information are timestamp information corresponding to a same service flow; and if the transmit-end timestamp information and the receive-end timestamp information are timestamp information corresponding to a same service flow, determining, by the MCP, details about a single network delay according to the transmit-end delay measurement information and the receive-end delay measurement information.

Specifically, in cooperation with the methods according to Embodiments 5 and 10 of the method for measuring a network delay according to the present application, the MCP in this embodiment of the present application may determine, according to the transmit-end service flow characteristic information, the transmit-end fragment reassembly identifier, the receive-end service flow characteristic information, and the receive-end fragment reassembly identifier, whether the transmit-end timestamp information and the receive-end timestamp information is timestamp information pertaining to a same data packet. If the transmit-end timestamp information and the receive-end timestamp information is timestamp information pertaining to a same data packet, the MCP updates the transmit-end timestamp information and the receive-end timestamp information to data entries of a corresponding data packet in Table 1; if the transmit-end timestamp information and the receive-end timestamp information are not timestamp information pertaining to a same data packet, the MCP updates the transmit-end timestamp information and the receive-end timestamp information to data entries of respective data packets. Referring to Table 1, the operation process of the MCP is described in detail. After the MCP receives the transmit-end delay measurement information, because with respect to a service flow, service flow characteristic information is unique, the MCP determines, according to the transmit-end service flow characteristic information, that is, a quintuple: a source IP address, a destination IP address, a protocol type, a source protocol port number, and a destination protocol port number, which service flow the transmit-end delay measurement information pertains to. After determining that the transmit-end delay measurement information pertains to a target service flow, the MCP finds a measurement data summary table for the target service flow corresponding to the service flow. In addition, because a transmit-end fragment reassembly identifier is also unique for a data packet, the MCP determines, according to the transmit-end fragment reassembly identifier, that the transmit-end delay measurement information pertains to a specific data packet of the target service flow, for example, the $N^{th}$ data packet, and therefore the MCP updates the transmit-end timestamp information carried in the transmit-end delay measurement information to data entries of a corresponding $N^{th}$ data packet. With respect to receive-end delay measurement information, the MCP also performs similar operations to identify the receive-end delay measurement information, and updates the identified receive-end delay measurement information to entries of the corresponding data packet; and subsequently the MCP performs corresponding delay calculations. The specific calculation methods and formulas have been described in detail in Embodiment 12 of the method for measuring a network delay according to the present application, and are not described herein again.

With the method for measuring a network delay according to this embodiment, an MCP receives transmit-end delay measurement information transmitted by a DCP corresponding to an upstream TLP, where the transmit-end delay measurement information includes timestamp information, a service flow identifier, a TLP identifier, transmit-end service flow characteristic information, and a transmit-end fragment reassembly identifier; the MCP receives receive-end delay measurement information transmitted by a DCP corresponding to a downstream TLP, where the receive-end delay measurement information includes timestamp information, a service flow identifier, a TLP identifier, receive-end service flow characteristic information, and a receive-end fragment reassembly identifier; and the MCP performs identification and matching according to the transmit-end service flow characteristic information, the transmit-end fragment reassembly identifier, the receive-end service flow characteristic information, and the receive-end fragment reassembly identifier, thereby ensuring that the transmit-end delay measurement information and the receive-end delay measurement information pertain to a same data packet; and the MCP performs delay calculation for the matched transmit-end delay measurement information and receive-end delay measurement information, thereby implementing direct and accurate measurement of a delay of a service flow.

Figure 8:
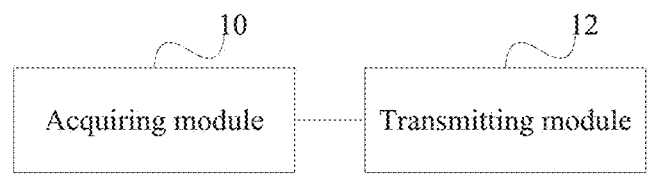
FIG. 8 is a schematic structural diagram of Embodiment 1 of a DCP according to the present application.

FIG. 8 is a schematic structural diagram of Embodiment 1 of a DCP according to the present application. As illustrated in FIG. 8, the DCP includes: an acquiring module 10 and a transmitting module 12.

The acquiring module 10 is configured to acquire delay measurement information obtained by measuring a service flow by at least one TLP, where the delay measurement information includes: timestamp information, a service flow identifier, and a TLP identifier.

The transmitting module 12 is configured to transmit the delay measurement information to a measurement control point MCP, so that the MCP determines details about a network delay according to the timestamp information, the service flow identifier, and the TLP identifier.

Specifically, DCPs are deployed on a transmit-end device and a receive-end device. Working principles and technical solutions of DCPs have been described in detail in Embodiment 1 of the method for measuring a network delay according to the present application, and are not described herein again.

The DCP according to this embodiment may be used to perform the technical solution in the embodiment illustrated in FIG. 1. The implementation principles and technical effects are similar, and are not described herein again.

With respect to the DCP according to this embodiment, when the DCP is a DCP managing an upstream TLP, the acquiring module 10 is specifically configured to acquire transmit-end delay measurement information obtained by measuring a transmitted service flow by at least one upstream TLP, and the transmitting module 12 is specifically configured to transmit the transmit-end delay measurement information to the MCP, where the transmit-end delay measurement information includes: transmit-end timestamp information, a service flow identifier, and a TLP identifier. The specific principles and methods have been described in detail in Embodiment 2 of the method for measuring a network delay according to the present application, and are not described herein again.

Alternatively, when the DCP is a DCP managing a downstream TLP, the acquiring module 10 is specifically configured to acquire receive-end delay measurement information obtained by measuring a received service flow by at least one downstream TLP, and the transmitting module 12 is specifically configured to transmit the receive-end delay measurement information to the MCP, where the transmit-end delay measurement information includes: receive-end timestamp information, a service flow identifier, and a TLP identifier. The specific principles and methods have been described in detail in Embodiment 2 of the method for measuring a network delay according to the present application, and are not described herein again.

Figure 9:
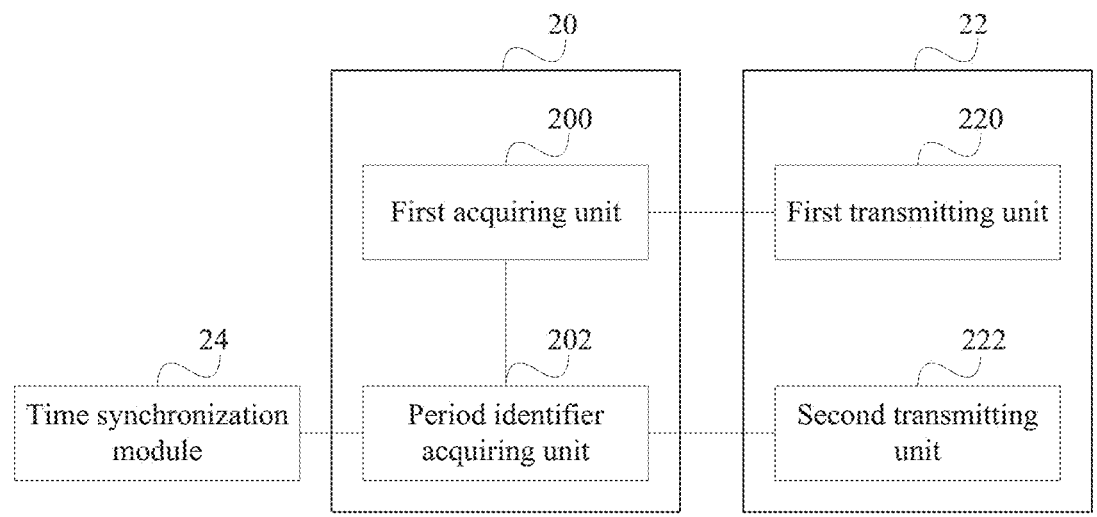
FIG. 9 is a schematic structural diagram of Embodiment 2 of a DCP according to the present application.

In one aspect, based on FIG. 8, FIG. 9 is a schematic structural diagram of Embodiment 2 of a DCP according to the present application. As illustrated in FIG. 9, an acquiring module 20 in the DCP according to Embodiment 2 of the present application includes: a first acquiring unit 200 and a period identifier acquiring unit 202.

The first acquiring unit 200 is configured to acquire the transmit-end delay measurement information obtained by measuring the transmitted service flow by the at least one upstream TLP, or acquire the receive-end delay measurement information obtained by measuring the received service flow by the at least one downstream TLP.

The period identifier acquiring unit 202 is configured to: when a measurement period ends, the period identifier acquiring unit 202 acquires a measurement period identifier, and transmits the measurement period identifier to the MCP; or when a measurement period of the DCP managing the downstream TLP starts, the period identifier acquiring unit 202 may acquire a boundary time point of each measurement period by using the NTP or an IEEE 1588v2 clock, that is, acquire start time of the measurement period; where if a difference between the start time and the timestamp information is less than or equal to a preset duration, the receive-end delay measurement information pertains to measurement information corresponding to the measurement period identifier; and if the difference between the start time and the timestamp information is greater than the preset duration, the measurement period identifier is increased by 1, the timestamp information pertains to a next measurement period, and a measurement period identifier of the DCP managing the downstream TLP within the measurement period is acquired. Optionally, the preset duration is $2/3$ of a duration of the measurement period. The specific working principles and methods have been described in detail in Embodiment 3 of the method for measuring a network delay according to the present application and FIG. 2, and are not described herein again.

Optionally, a corresponding DCP may directly read the transmit-end delay measurement information and the receive-end delay measurement information generated by the upstream TLP and the downstream TLP respectively, and the period identifier acquiring unit 202 of the DCP acquires two measurement period identifiers according to the transmit-end delay measurement information and the receive-end delay measurement information respectively. In addition, for a data packet to which a delay measurement flag is added within a measurement period, the two measurement period identifiers acquired by the DCP managing the upstream TLP and the DCP managing the downstream TLP are consistent.

As illustrated in FIG. 9, a transmitting module 22 in the DCP according to Embodiment 2 of the present application includes a first transmitting unit 220 and a second transmitting unit 222.

The first transmitting unit 220 is configured to transmit the transmit-end delay measurement information to the MCP, or transmit the receive-end delay measurement information to the MCP.

The second transmitting unit 222 is configured to: when the measurement period ends, transmit the measurement period identifier acquired by a period identifier acquiring unit 202 of the DCP managing the upstream TLP to the MCP, or transmit the measurement period identifier acquired by a period identifier acquiring unit 202 of the DCP managing the downstream TLP to the MCP.

Optionally, the DCP according to Embodiment 2 of the present application further includes: a time synchronization module 24.

The time synchronization module 24 is configured to: before the acquiring module 20 acquires delay measurement information obtained by at least one TLP by measuring a service flow, perform time synchronization with the TLP by using the NTP or an IEEE 1588v2 clock, and perform time synchronization between the DCP managing the upstream TLP and the DCP managing the downstream TLP by using the NTP or an IEEE 1588v2 clock. The NTP or an IEEE 1588v2 clock, and time synchronization methods and principles have been described in detail in Embodiment 3 of the method for measuring a network delay according to the present application, and are not described herein again.

The DCP according to this embodiment may be used to perform the technical solution in Embodiment 3 of the method for measuring a network delay according to the present application. The implementation principles and technical effects are similar, and are not described herein again.

Figure 10:
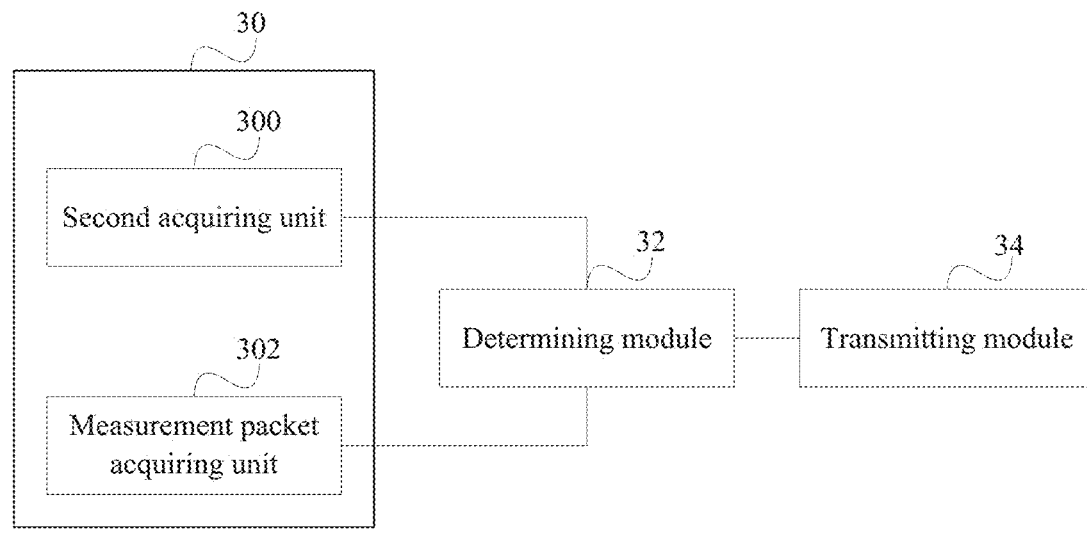
FIG. 10 is a schematic structural diagram of Embodiment 3 of a DCP according to the present application.

In another aspect, based on FIG. 8, FIG. 10 is a schematic structural diagram of a DCP according to Embodiment 3 of the present application. As illustrated in FIG. 8, the DCP includes: an acquiring module 30, a determining module 32, and a transmitting module 34. The acquiring module 30 includes a second acquiring unit 300 and a measurement packet acquiring unit 302.

The second acquiring unit 300 is configured to acquire the transmit-end delay measurement information obtained by measuring the transmitted service flow by the at least one upstream TLP, or acquire the receive-end delay measurement information obtained by measuring the received service flow by the at least one downstream TLP.

Specifically, the transmit-end delay measurement information includes: transmit-end timestamp information, a service flow identifier, and a TLP identifier; and the receive-end delay measurement information includes: receive-end timestamp information, a service flow identifier, and a TLP identifier.

The measurement packet acquiring unit 302 is configured to acquire a measurement packet transmitted by the upstream TLP and received by the at least one downstream TLP, and arrival timestamp information of the measurement packet, which is generated when the measurement packet arrives at the downstream TLP, where the measurement packet includes: transmit-end timestamp information;

The determining module 32 is specifically configured to determine whether the arrival timestamp information and the receive-end timestamp information pertain to a preset duration range; and if the arrival timestamp information and the receive-end timestamp information pertain to the preset duration range, determine that the transmit-end timestamp information and the receive-end timestamp information pertain to a same data packet. The specific determining principles and methods have been described in detail in Embodiment 4 of the method for measuring a network delay according to the present application, and are not described herein again.

The transmitting module 34 is specifically configured to transmit a result of the determining to the MCP.

It should be noted that, the determining module 32 may transmit the transmit-end timestamp information and the receive-end timestamp information that pertain to a same data packet to the transmitting module 34, and the transmitting module 34 transmits the transmit-end timestamp information and the receive-end timestamp information to the MCP, and the MCP performs delay calculation. Alternatively, the determining module 32 may directly determine details about a delay of the data packet within the period according to the transmit-end timestamp information and the receive-end timestamp information that pertain to a same measurement period, and then transmits calculated details about the delay to the MCP.

The DCP according to this embodiment may be used to perform the technical solution in Embodiment 4 of the method for measuring a network delay according to the present application. The implementation principles and technical effects are similar, and are not described herein again.

In still another aspect, referring to FIG. 8, a DCP according to Embodiment 4 of the present application includes: an acquiring module 10 and a transmitting module 12.

With respect to the acquiring module 10, when the DCP is a data collecting point managing an upstream TLP, the acquiring module 10 is specifically configured to acquire transmit-end delay measurement information, where the transmit-end delay measurement information further includes: transmit-end service flow characteristic information and a transmit-end fragment reassembly identifier. When the DCP is a data collecting point managing a downstream TLP, the acquiring module 10 is specifically configured to acquire receive-end delay measurement information, where the receive-end delay measurement information further includes: receive-end service flow characteristic information and a receive-end fragment reassembly identifier.

With respect to the transmitting module 12, when the DCP is a data collecting point managing an upstream TLP, the transmitting module 12 is specifically configured to transmit the transmit-end delay measurement information to the MCP, so that the MCP determines, according to the transmit-end service flow characteristic information, the transmit-end fragment reassembly identifier, the receive-end service flow characteristic information, and the receive-end fragment reassembly identifier, that the transmit-end timestamp information and the receive-end timestamp information are timestamp information corresponding to a same service flow.

Specifically, service flow characteristic information and a fragment reassembly identifier, and corresponding operations performed by the DCP based on the service flow characteristic information and the fragment reassembly identifier have been described in detail in Embodiment 5 of the method for measuring a network delay, and are not described herein again.

The DCP according to this embodiment may be used to perform the technical solution in Embodiment 5 of the method for measuring a network delay according to the present application. The implementation principles and technical effects are similar, and are not described herein again.

Figure 11:
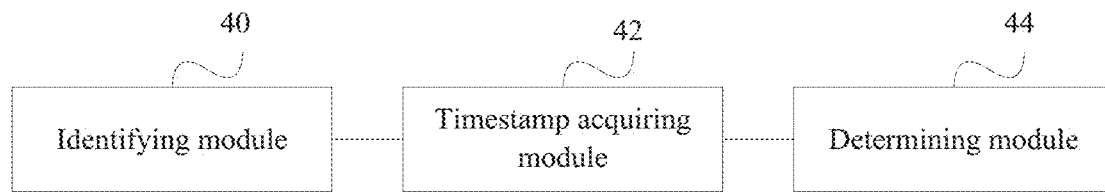
FIG. 11 is a schematic structure view of Embodiment 1 of a TLP according to the present application.

FIG. 11 is a schematic structural diagram of Embodiment 1 of a TLP according to the present application. As illustrated in FIG. 11, the TLP includes: an identifying module 40, a timestamp acquiring module 42, and a determining module 44.

The identifying module 40 is configured to identify a service flow according to service flow characteristic information, and determine whether the service flow is a target service flow.

Specifically, how to identify a service flow according to service flow characteristic information has been described in detail in Embodiment 6 of the method for measuring a network delay, and is not described herein again.

The timestamp acquiring module 42 is configured to: if the service flow is the target service flow, add a delay measurement flag to a data packet of the service flow, and acquire data packet delay measurement information corresponding to the delay measurement flag.

Specifically, the timestamp acquiring module 42 adds a delay measurement flag to a data packet of the target service flow, and generates delay measurement information, where the delay measurement information includes: timestamp information, a service flow identifier, and a TLP identifier. The timestamp information is a time point when the delay measurement flag is added by the TLP. The service flow identifier and the TLP identifier have been described in detail in Embodiment 1 of the method for measuring a network delay, and are not described herein again.

The determining module 44 is configured to determine delay measurement information, where the delay measurement information includes: timestamp information, a service flow identifier, a TLP identifier, so that after acquiring the delay measurement information, the DCP transmits the delay measurement information to an MCP.

The TLP according to this embodiment may be used to perform the technical solution in Embodiment 6 of the method for measuring a network delay according to the present application. The implementation principles and technical effects are similar, and are not described herein again.

In the TLP according to this embodiment, optionally, the adding a delay measurement flag to a data packet of the service flow by the timestamp acquiring module 42, and acquiring data packet delay measurement information corresponding to the delay measurement flag includes that:

the timestamp acquiring module 42 of an upstream TLP is specifically configured to add a delay measurement flag to the data packet of the target service flow, and the timestamp acquiring module acquires transmit-end delay measurement information of the data packet corresponding to the delay measurement flag, where the transmit-end delay measurement information includes: transmit-end timestamp information, a service flow identifier, and a TLP identifier, so that after acquiring the transmit-end delay measurement information, a DCP managing the upstream TLP transmits the transmit-end delay measurement information to the MCP.

The timestamp acquiring module 42 of a downstream TLP is specifically configured to: when the identifying module identifies the data packet to which the delay measurement flag is added, the timestamp acquiring module acquires transmit-end delay measurement information of the data packet corresponding to the delay measurement flag, where the receive-end delay measurement information includes: receive-end timestamp information, a service flow identifier, and a TLP identifier, so that after acquiring the receive-end delay measurement information, a DCP managing the downstream TLP transmits the receive-end delay measurement information to the MCP.

Figure 12:
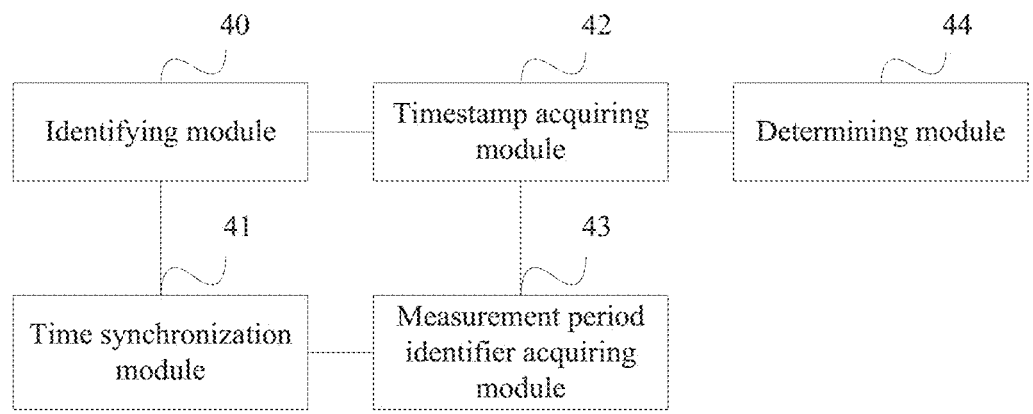
FIG. 12 is a schematic structural diagram of Embodiment 2 of a TLP according to the present application.

In one aspect, based on FIG. 11, FIG. 12 is a schematic structural diagram of Embodiment 2 of a TLP according to the present application. As illustrated in FIG. 12, the TLP further includes: a time synchronization module 41 and a measurement period identifier acquiring module 43.

When the TLP is an upstream TLP, the time synchronization module 41 is specifically configured to: before a timestamp acquiring module 42 of the upstream TLP adds the delay measurement flag to the data packet of the target service flow, perform time synchronization with the DCP managing the upstream TLP by using the NTP or an IEEE 1588v2 clock. When the TLP is a downstream TLP, the time synchronization module 41 is specifically configured to: before an identifying module 40 of the downstream TLP identifies the data packet to which the delay measurement flag is added, perform time synchronization with the DCP managing the downstream TLP by using the NTP or an IEEE 1588v2 clock. The time synchronization methods and principles have been described in detail in Embodiment 3 of the method for measuring a network delay according to the present application, and are not described herein again.

When the TLP is an upstream TLP, the measurement period identifier acquiring module 43 is specifically configured to acquire a measurement period identifier corresponding to the delay measurement flag, so that after acquiring the measurement period identifier, the DCP managing the upstream TLP transmits information about the measurement period identifier to the MCP. When the TLP is a downstream TLP, the measurement period identifier acquiring module 43 is specifically configured to acquire the measurement period identifier corresponding to the delay measurement flag, and start time of each measurement period, so that after acquiring the start time and the measurement period identifier, the DCP managing the downstream TLP performs matching between the start time and the measurement period identifier, and then transmits the receive-end delay measurement information to the MCP.

It should be noted that, the DCP may directly read the delay measurement information generated by the TLP, and the DCP may acquire the corresponding measurement period identifier by using the delay measurement information. In this solution, the upstream TLP or the downstream TLP may not employ the measurement period identifier acquiring module 43. In addition, with respect to the TLP according to this embodiment, the TLP identifies the data packet of the service flow based on each period, and adds the delay measurement flag. Optionally, within each measurement period, corresponding operations are performed on only one data packet.

The TLP according to this embodiment may be used to perform the technical solution in Embodiment 8 of the method for measuring a network delay according to the present application. The implementation principles and technical effects are similar, and are not described herein again.

Figure 13:
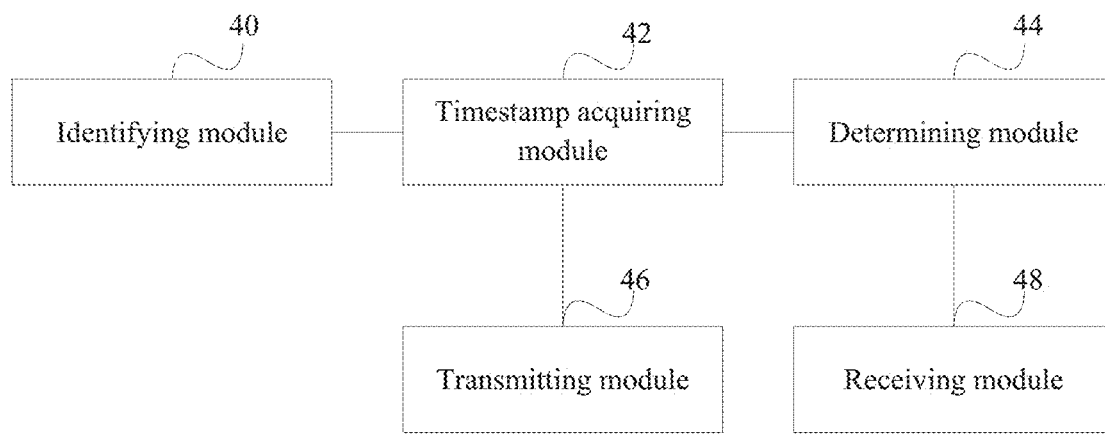
FIG. 13 is a schematic structural diagram of Embodiment 3 of a TLP according to the present application.

In another aspect, based on FIG. 11, FIG. 13 is a schematic structural diagram of a TLP according to Embodiment 3 of the present application. As illustrated in FIG. 13, the TLP further includes: a transmitting module 46 and a receiving module 48.

The transmitting module 46 is specifically configured to transmit a measurement packet to the downstream TLP by using a transmitting module of the upstream TLP, where the measurement packet includes: transmit-end timestamp information.

Specifically, after an identifying module 40 of the upstream TLP adds the delay measurement flag to the data packet of the target service flow, the timestamp acquiring module 42 adds the delay measurement flag to the data packet, and acquires data packet delay measurement information corresponding to the delay measurement flag. In this case, the upstream TLP starts the transmitting module 46, and the transmitting module 46 transmits the measurement packet to the downstream TLP.

The receiving module 48 is specifically configured to receive the measurement packet by using a receiving module of the downstream TLP, generate arrival timestamp information of the measurement packet, and transmit the measurement packet and the arrival timestamp information to the DCP managing the downstream TLP, so that the DCP determines whether the arrival timestamp information and the receive-end timestamp information pertain to a preset duration range, and if the arrival timestamp information and the receive-end timestamp information pertain to the preset duration range, determines that the transmit-end timestamp information and the receive-end timestamp information pertain to the same measurement period, and transmits a result of the determining to the MCP.

Specifically, the identifying module 40 of the downstream TLP identifies the data packet with the delay measurement flag, and generates corresponding receive-end timestamp information; the receiving module 48 receives the measurement packet, records a time point when the measurement packet is received, generates arrival timestamp information, and transmits the measurement packet and the arrival timestamp information to the determining module 44, so that the determining module 44 transmits the measurement packet, the receive-end delay measurement information, and the arrival timestamp information to the DCP managing the downstream TLP; therefore, the DCP managing the downstream TLP performs corresponding operations.

In addition, in the method for measuring a network delay according to this embodiment, the TLP identifies the data packet of the service flow, with respect to each measurement period, the TLP adds a delay measurement flag to the data packet within an interval of the measurement period. Optionally, within each measurement period, the TLP adds a delay measurement flag to only one data packet.

The TLP according to this embodiment may be used to perform the technical solution in Embodiment 9 of the method for measuring a network delay according to the present application. The implementation principles and technical effects are similar, and are not described herein again.

In still another aspect, referring to FIG. 11, in a TLP according to Embodiment 4 of the present application, the transmit-end delay measurement information acquired by a timestamp acquiring module 42 of the upstream TLP further includes: transmit-end service flow characteristic information and a transmit-end fragment reassembly identifier; and the receive-end delay measurement information acquired by a timestamp acquiring module 42 of the downstream TLP further includes: receive-end service flow characteristic information and a receive-end fragment reassembly identifier;

so that the DCP managing the upstream TLP acquires the transmit-end delay measurement information and transmits the transmit-end delay measurement information to the MCP, and the DCP managing the downstream TLP acquires the receive-end delay measurement information and transmits the receive-end delay measurement information to the MCP; therefore, the MCP determines, according to the transmit-end service flow characteristic information, the transmit-end fragment reassembly identifier, the receive-end service flow characteristic information, and the receive-end fragment reassembly identifier, whether the transmit-end timestamp information and the receive-end timestamp information are timestamp information corresponding to a same service flow.

The TLP according to this embodiment may be used to perform the technical solution in Embodiment 10 of the method for measuring a network delay according to the present application. The implementation principles and technical effects are similar, and are not described herein again.

Optionally, in Embodiment 1 to Embodiment 4 of the TLP according to the present application, the adding, by the timestamp acquiring module of the upstream TLP, a delay measurement flag to the data packet of the target service flow includes: adding, by the timestamp acquiring module, a delay measurement flag in a reserved bit of TOS or a reserved bit of Flags in an IP header of the data packet. In this way, the delay measurement flag may be added to the data packet by using the reserved bit of TOS or the reserved bit of Flags, and normal transmission of the data packet is ensured.

In addition, the identifying module 40 is specifically configured to identify the service flow according to information about at least two tuples in a quintuple, to ensure effective identification of the service flow.

Specifically, the reserved bit of TOS or the reserved bit of Flags, and the quintuple have been described in detail in Embodiment 7 of the method for measuring a network delay according to the present application, and are not described herein again.

Figure 14:
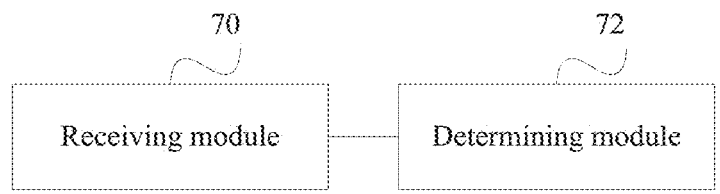
FIG. 14 is a schematic structural diagram of Embodiment 1 of an MCP according to the present application.

FIG. 14 is a schematic structural diagram of Embodiment 1 of an MCP according to the present application. As illustrated in FIG. 14, the MCP includes: a receiving module 70 and a determining module 72.

The receiving module 70 is configured to receive transmit-end delay measurement information transmitted by a DCP corresponding to an upstream TLP and receive-end delay measurement information transmitted by a DCP corresponding to a downstream TLP, where the transmit-end delay measurement information includes: transmit-end timestamp information, a service flow identifier, and a TLP identifier; and the receive-end delay measurement information includes: receive-end timestamp information, a service flow identifier, and a TLP identifier;

The determining module 72 is configured to determine details about a single network delay according to the transmit-end delay measurement information and the receive-end delay measurement information.

Specifically, the MCP is deployed on any network element node device on the network, and operationally deployed on a network element node device with powerful functions. The determining module 72 maintains a measurement data summary table for a target service flow. For details, refer to Table 1. The specific calculation principles and formulas employed by the determining module 72 have been described in detail in Embodiment 12 of the method for measuring a network delay according to the present application, and are not described herein again.

The MCP according to this embodiment may be used to perform the technical solution in Embodiment 11 of the method for measuring a network delay according to the present application. The implementation principles and technical effects are similar, and are not described herein again.

Figure 15:
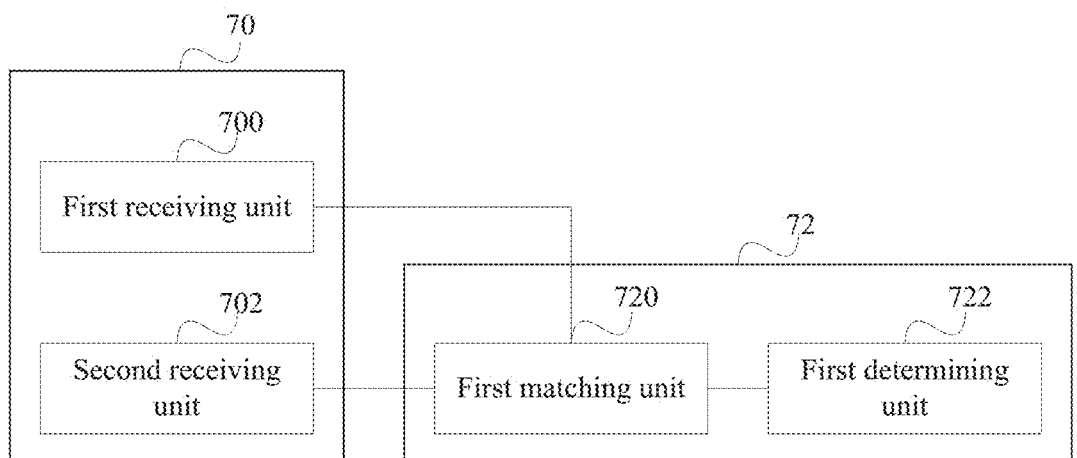
FIG. 15 is a schematic structural diagram of Embodiment 2 of an MCP according to the present application.

In one aspect, based on FIG. 14, FIG. 15 is a schematic structural diagram of Embodiment 2 of an MCP according to the present application. The MCP includes: a receiving module 70 and a determining module 72, where the receiving module 70 includes a first receiving unit 700 and a second receiving unit 702. The determining module 72 includes: a first matching unit 720 and a first determining unit 722.

The first receiving unit 700 is specifically configured to receive the transmit-end delay measurement information transmitted by the DCP corresponding to the upstream TLP and the receive-end delay measurement information transmitted by the DCP corresponding to the downstream TLP, where the transmit-end delay measurement information includes: transmit-end timestamp information, a service flow identifier, and a TLP identifier; and the receive-end delay measurement information includes: receive-end timestamp information, a service flow identifier, and a TLP identifier.

The second receiving unit 702 is specifically configured to receive a measurement period identifier transmitted by the DCP managing the upstream TLP, and receive a measurement period identifier transmitted by the DCP managing the downstream TLP.

The first matching unit 720 is specifically configured to determine, according to the measurement period identifier transmitted by the DCP managing the upstream TLP and the measurement period identifier transmitted by the DCP managing the downstream TLP, whether the transmit-end delay measurement information and the receive-end delay measurement information pertain to a same measurement period.

Specifically, after the second receiving unit 702 receives the measurement period identifier, the first matching unit 720 updates, according to the measurement period identifier transmitted by the DCP managing the upstream TLP and the measurement period identifier transmitted by the DCP managing the downstream TLP, the transmit-end delay measurement information and the receive-end delay measurement information that pertain to a same measurement period to corresponding entries in the measurement data summary table for the target service flow that is maintained by the MCP.

The first determining module 722 is specifically configured to: if the transmit-end delay measurement information and the receive-end delay measurement information pertain to a same measurement period, determine details about a single network delay according to the transmit-end delay measurement information and the receive-end delay measurement information.

Specifically, after the first determining unit 722 detects that a data arrival flag of a data entry corresponding to a forward service flow identifier or a backward service flow in a measurement period identifier in Table 1 is set to "All arrive", the first determining unit 722 performs delay calculation according to the corresponding transmit-end timestamp information and the corresponding receive-end timestamp information. The specific calculation principles and formulas have been described in detail in Embodiment 12 of the method for measuring a network delay according to the present application, and are not described herein again.

The MCP according to this embodiment may be used to perform the technical solution in Embodiment 12 of the method for measuring a network delay according to the present application. The implementation principles and technical effects are similar, and are not described herein again.

In another aspect, referring to FIG. 12, an MCP according to Embodiment 3 of the present application includes: a receiving module 70 and a determining module 72.

The receiving module 70 is specifically configured to receive the transmit-end delay measurement information transmitted by the DCP corresponding to the upstream TLP, and the receive-end delay measurement information that is determined as pertaining to a same data packet as the transmit-end delay measurement information and is transmitted by the DCP corresponding to the downstream TLP.

The determining module 72 is specifically configured to determine details about a single network delay according to the transmit-end delay measurement information and the receive-end delay measurement information.

Specifically, the DCP may transmit the matched transmit-end delay measurement information and receive-end delay measurement information to the MCP, the receiving module 70 of the MCP receives and updates the transmit-end delay measurement information and the receive-end delay measurement information to data entries of the corresponding data packet, and the determining module 72 determines details about a delay. The DCP may also determine details about a delay according to the matched transmit-end delay measurement information and receive-end delay measurement information, and then transmits the determined details about a delay to the MCP. In this case, the receiving module 70 of the MCP directly receives the details about a delay, and the determining module 72 does not need to be started.

The MCP according to this embodiment may be used to perform the technical solution in Embodiment 13 of the method for measuring a network delay according to the present application. The implementation principles and technical effects are similar, and are not described herein again.

Figure 16:
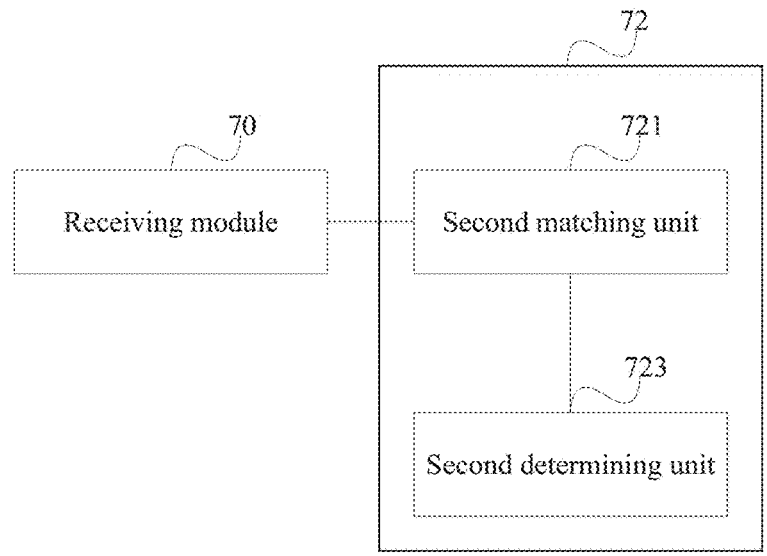
FIG. 16 is a schematic structural diagram of Embodiment 4 of an MCP according to the present application.

In still another aspect, based on FIG. 14, FIG. 16 is a schematic structural diagram of Embodiment 4 of an MCP according to the present application. As illustrated in FIG. 16, the MCP includes: a receiving module 70 and a determining module 72.

The receiving module 70 is specifically configured to: receive the transmit-end delay measurement information transmitted by the DCP corresponding to the upstream TLP, where the transmit-end delay measurement information includes: the timestamp information, the service flow identifier, the TLP identifier, transmit-end service flow characteristic information, and a transmit-end fragment reassembly identifier; and receive the receive-end delay measurement information transmitted by the DCP corresponding to the downstream TLP, where the receive-end delay measurement information includes: the timestamp information, the service flow identifier, the TLP identifier, receive-end service flow characteristic information, and a receive-end fragment reassembly identifier.

The determining module 72 includes: a second matching unit 721 and a second determining unit 723.

The second matching unit 721 is specifically configured to determine, according to the transmit-end service flow characteristic information, the transmit-end fragment reassembly identifier, the receive-end service flow characteristic information, and the receive-end fragment reassembly identifier, whether the transmit-end timestamp information and the receive-end timestamp information are timestamp information are timestamp information corresponding to a same data packet. The specific working principles and methods have been described in detail in Embodiments 5, 10, and 14 of the method for measuring a network delay according to the present application, and are not described herein again.

The second determining module 723 is specifically configured to: if the transmit-end timestamp information and the receive-end timestamp information are timestamp information corresponding to a same data packet, determine details about a single network delay according to the transmit-end delay measurement information and the receive-end delay measurement information. The specific working principles and methods have been described in detail in Embodiments 5, 10, and 14 of the method for measuring a network delay according to the present application, and are not described herein again.

The MCP according to this embodiment may be used to perform the technical solution in Embodiment 14 of the method for measuring a network delay according to the present application. The implementation principles and technical effects are similar, and are not described herein again.

Figure 17:
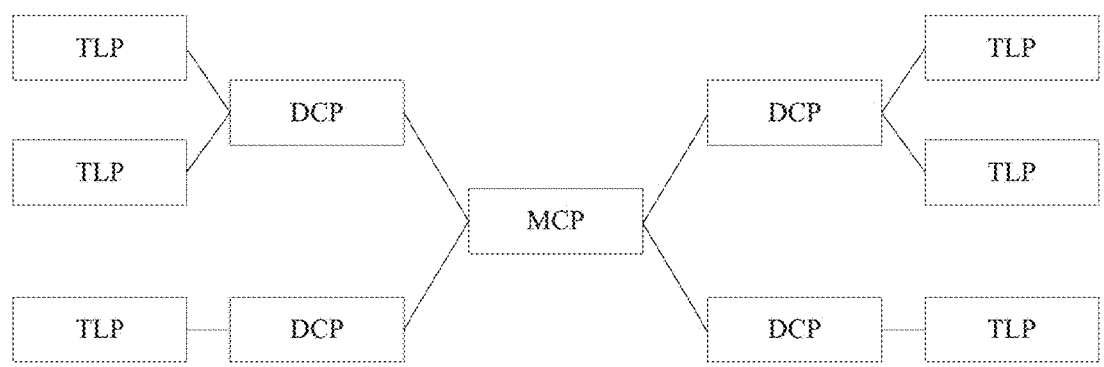
FIG. 17 is a schematic structural diagram of Embodiment 1 of a system for measuring a network delay according to the present application.

FIG. 17 is a schematic structural diagram of Embodiment 1 of a system for measuring a network delay according to the present application. As illustrated in FIG. 17, the system according to this embodiment includes: DCPs, TLPs, and an MCP. Optionally, a random quantity of TLPs are deployed on both sides of a network, and DCPs are deployed correspondingly. This embodiment sets no limitation to the quantity of TLPs and that of the corresponding DCPs. The DCPs may employ the structures illustrated in FIG. 8 to FIG. 10, and may correspondingly perform the technical solutions in Embodiment 1 to Embodiment 5;

the TLPs may employ the structures illustrated in FIG. 11 to FIG. 13, and may correspondingly perform the technical solutions in Embodiment 6 to Embodiment 10; the MCP may employ the structures illustrated in FIG. 14 to FIG. 16, and may correspondingly perform the technical solutions in Embodiment 11 to Embodiment 14. The implementation principles and technical effects of the DCPs, the TLPs, and the MCP are similar, and are not described herein again.

Figure 18:
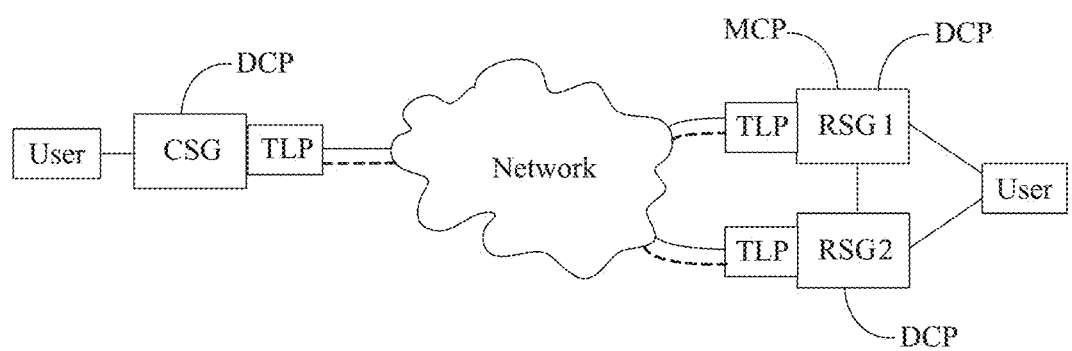
FIG. 18 is a schematic diagram of Embodiment 2 of a system for measuring a network delay according to the present application.

FIG. 18 is a schematic diagram of Embodiment 2 of a system for measuring a network delay according to the present application. Referring to FIG. 17 and FIG. 18, the following comprehensively describes the method, apparatus, and system for measuring a network delay according to the present application.

Referring to FIG. 18, TLPs are deployed a network side of an upstream transmit end and a downstream receive end. Optionally, the TLPs may also be deployed on a user side, and DCPs are deployed on devices at the upstream transmit end and those at the downstream receive end. Referring to FIG. 18, when a target service flow is in a direction from left to right, a cell site gateway CSG (Cell Site Gateway, hereinafter referred to as CSG) is the upstream transmit-end device, radio network controller site gateway RSG (Radio Network Controller Site Gateway, hereinafter referred to as RSG) 1 and RSG 2 are the devices at the downstream receive end; and when the target service flow is in a direction from right to left, reverse setting is performed for the upstream and the downstream. The specific technical solution has been described in detail in Embodiment 12 of the method for measuring a network delay according to the present application, and is not described herein again. In addition, an MCP is deployed on any network element node on the entire network. For example, as illustrated in FIG. 18, an MCP is deployed on RSG 1. Optionally, the MCP may be deployed on a network element node with powerful functions, and a transmission path of delay measurement information is differentiated from a transmission path of the target service flow for out-band transmission, thereby ensuring independence in optionally reading and transmitting the delay measurement information. A management network (as illustrated in FIG. 18, a path of a management network layer is represented by dotted lines) may employ a Layer 3 measurement VPN, a DCN, or a public network with reachable IP addresses.

When a network delay is enabled, the TLPs, the DCPs, and the MCP cooperate to directly measure the delay of the service flow. The specific methods and technical solutions have been described in Embodiments 1 to 14 of the method for measuring a network delay according to the present application, Embodiments 1 to 4 of the DCP according to the present application, Embodiments 1 to 4 of the TLP according to the present application, and Embodiments 1 to 4 of the MCP according to the present application, and are not described herein again.

Some networks are hybrid networks including a Layer 2 VPN network and a Layer-3 VPN network. Because the Layer 2 VPN network and the Layer 3 VPN network have different measurement criteria, with respect to this network scenario, there is no feasible and effective delay measuring method in the prior art. As can be learned from Embodiment 1, with respect to acquisition and transmission of the delay measurement information between the TLPs, the DCPs, and the MCP according to the embodiments of the present application, out-band transmission is implemented by means of transmission on the management network, thereby effectively preventing the problem of delay measurement information due to different measurement criteria of the Layer 2 VPN network and the Layer 3 VPN network.

Referring to FIG. 18, with respect to a dual-homing access scenario of devices RSG 1 and RSG 2 on the right side of the network, when path switching occurs on RSG 1 and RSG 2, because delay measurement information according to the embodiments of the present application includes: timestamp information, a service flow identifier, and a TLP identifier, in cases of switchover between RSG 1 and RSG 2, a TLP on a new receive device performs delay measurement on a data packet of a target service flow. For example, when the target service flow is originated from a left-side user, the TLP on the CSG identifies the target service flow, enables network delay measurement, and subsequently the target service flow passes through the network to arrive at the TLP on RSG 1. The TLP on RSG 1 performs corresponding receive-end delay measurement. When the RSG 1 encounters a fault, the target service flow is switched to RSG 2. In this case, the TLP on RSG 2 may identify the target service flow and continuously perform the corresponding delay measurement.

Persons of ordinary skill in the art may understand that all or a part of the steps of the method embodiments may be implemented by a program instructing related hardware. The program may be stored in a computer readable storage medium. When the program runs, the methods of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A method for measuring a network delay of a network, comprising:
acquiring, by a data collecting point (DCP) managing an upstream target logical port (TLP), transmit-end delay measurement information obtained by measuring a service flow by the upstream TLP that is transmitted through the network, wherein the transmit-end delay measurement information comprises transmit-end timestamp information, a service flow identifier of the service flow, and a TLP identifier of the upstream TLP, and wherein the transmit-end delay measurement information is corresponding to a data packet including a delay measurement flag ;
acquiring, by a DCP managing a downstream TLP, receive-end delay measurement information obtained by measuring the service flow by the downstream TLP, wherein the receive-end delay measurement information comprises receive-end timestamp information, the service flow identifier of the service flow, and a TLP identifier of the downstream TLP, and wherein the receive-end delay measurement information is corresponding to the data packet including the delay measurement flag;
transmitting, by the DCP managing the upstream TLP, the transmit-end delay measurement information to a measurement control point (MCP); and
transmitting, by the DCP managing the downstream TLP, the receive-end delay measurement information to the MCP;
wherein, the transmit-end delay measurement information and the receive-end delay measurement information are used to determine a network delay of the network.

2. The method according to claim 1, further comprising:
when a measurement period for measuring the service flow ends, acquiring, by the DCP managing the upstream TLP, a measurement period identifier of the measurement period;
transmitting, by the DCP managing the upstream TLP, the measurement period identifier to the MCP; and
acquiring, by the DCP managing the downstream TLP, start time of the measurement period, wherein if a difference between the start time and the receive-end timestamp information is not more than a preset duration, the receive-end delay measurement information corresponds to the measurement period identifier, and if the difference between the start time and the receive-end timestamp information is greater than the preset duration, the measurement period identifier is increased by 1, the timestamp information corresponds to a next measurement period, and the measurement period identifier is transmitted to the MCP.

3. The method according to claim 2, wherein the preset duration is ⅔ of a duration of the measurement period.

4. The method according to claim 2, further comprising:
performing, by the DCP managing the upstream TLP, time synchronization with the upstream TLP by using at least one of the Network Time Protocol (NTP) and an IEEE 1588v2 clock; performing, by the DCP managing the downstream TLP, time synchronization with the downstream TLP by using at least one of the NTP and an IEEE 1588v2 clock; and performing, by the DCP managing the upstream TLP, time synchronization with the DCP managing the downstream TLP by using at least one of the NTP and an IEEE 1588v2 clock.

5. The method according to claim 1, further comprising:
acquiring, by the DCP managing the downstream TLP, a measurement packet transmitted by the upstream TLP and received by the downstream TLP, and arrival timestamp information of the measurement packet, which is generated when the measurement packet arrives at the downstream TLP, wherein the measurement packet comprises: transmit-end timestamp information; and
determining, by the DCP managing the downstream TLP, whether the arrival timestamp information and the receive-end timestamp information correspond to a preset duration range; and if the arrival timestamp information and the receive-end timestamp information correspond to the preset duration range, determining that the transmit-end timestamp information and the receive-end timestamp information correspond to a same data packet, and transmitting a result of the determining to the MCP.

6. The method according to claim 1, wherein the transmit-end delay measurement information further comprises: service flow characteristic information of the service flow and a transmit-end fragment reassembly identifier of a data packet of the service flow; and the receive-end delay measurement information further comprises: the service flow characteristic information of the service flow and the receive-end fragment reassembly identifier.

7. The method according to claim 1, wherein, within each measurement period one data packet is added with the delay measurement flag.

8. A method for measuring a network delay of a network, comprising:
determining, by an upstream target logical port (TLP), a service flow that is transmitted through the network is a target service flow according to service flow characteristic information of the service flow;
adding, by the upstream TLP, a delay measurement flag to a data packet of the service flow;
acquiring, by the upstream TLP, transmit-end delay measurement information of the data packet to which the delay measurement flag is added, wherein the transmit-end delay measurement information comprises transmit-end timestamp information, a service flow identifier of the service flow, and a TLP identifier of the upstream TLP; and
indentifying, by a downstream TLP, the data packet to which the delay measurement flag is added;
acquiring, by a downstream TLP, receive-end delay measurement information of the data packet, wherein the receive-end delay measurement information comprises receive-end timestamp information, a service flow identifier of the service flow, and a TLP identifier of the downstream TLP.

9. The method according to claim 8,
before the adding the delay measurement flag to the data packet of the target service flow, the method further comprises: performing, by the upstream TLP, time synchronization with the DCP managing the upstream TLP by using at least one of the Network Time Protocol (NTP) and an IEEE 1588v2 clock; and before identifying the data packet to which the delay measurement flag is added, performing, by the downstream TLP, time synchronization with the DCP managing the downstream TLP by using at least one of the NTP and an IEEE 1588v2 clock;

the method further comprises:

acquiring, by the upstream TLP, a measurement period identifier corresponding to the delay measurement flag; and acquiring, by the downstream TLP, start time of each measurement period within the measurement period, and when identifying, within each measurement period, the data packet to which the delay measurement flag is added, acquiring the measurement period identifier corresponding to the delay measurement flag.

10. The method according to claim 8, further comprising: transmitting, by the upstream TLP, a measurement packet to the downstream TLP, wherein the measurement packet comprises: transmit-end timestamp information; receiving, by the downstream TLP, the measurement packet, generating arrival timestamp information of the measurement packet, and transmitting the measurement packet and the arrival timestamp information to the DCP managing the downstream TLP.

11. The method according to claim 8, wherein the transmit-end delay measurement information further comprises: the service flow characteristic information and a transmit-end fragment reassembly identifier of the data packet; and the receive-end delay measurement information further comprises: the service flow characteristic information and the receive-end fragment reassembly identifier.

12. The method according to claim 8, wherein the adding, by an upstream TLP, a delay measurement flag to the data packet of the target service flow comprises:

adding the delay measurement flag in at least one of: a reserved bit of type of service TOS and a reserved bit of Flags in an IP header of the data packet.

13. The method according to claim 8, wherein the determining the service flow that is transmitted through the network is the target service flow comprises:

determining the service flow is the target service flow according to at least two tuples in a quintuple of the service flow.

14. The method according to claim 8, wherein, within each measurement period one data packet is added with the delay measurement flag by the upstream TLP.

15. A method for measuring a network delay of a network, comprising:

receiving, by a measurement control point (MCP), transmit-end delay measurement information transmitted by a data collecting point (DCP) corresponding to an upstream target logical port (TLP) and receive-end delay measurement information transmitted by a DCP corresponding to a downstream TLP, wherein the transmit-end delay measurement information comprises: transmit-end timestamp information, a service flow identifier of a service flow which is transmitted through the network, and a TLP identifier of the upstream TLP; and the receive-end delay measurement information comprises: receive-end timestamp information, a service flow identifier of the service flow, and a TLP identifier of the downstream TLP, and wherein the transmit-end delay measurement information and the receive-end delay measurement information are corresponding to a data packet including a delay measurement flag; and determining, by the MCP, network delay of the network according to the transmit-end delay measurement information and the receive-end delay measurement information.

16. The method according to claim 15, further comprising:

receiving, by the MCP, a measurement period identifier transmitted by the DCP managing the upstream TLP;

receiving, by the MCP, a measurement period identifier transmitted by the DCP managing the downstream TLP;

determining, by the MCP according to the measurement period identifier transmitted by the DCP managing the upstream TLP and the measurement period identifier transmitted by the DCP managing the downstream TLP, whether the transmit-end delay measurement information and the receive-end delay measurement information correspond to a same measurement period; and determining, by the MCP, the network delay according to the transmit-end delay measurement information and the receive-end delay measurement information, when the transmit-end delay measurement information and the receive-end delay measurement information correspond to a same measurement period.

17. The method according to claim 15, the receiving, by the measurement control point (MCP), the transmit-end delay measurement information transmitted by a data collecting point (DCP) comprises:

receiving, by the MCP, the transmit-end delay measurement information transmitted by the DCP corresponding to the upstream TLP; and receiving, by the MCP, the receive-end delay measurement information that is determined as corresponding to a same data packet as the transmit-end delay measurement information and is transmitted by the DCP corresponding to the downstream TLP.

18. The method according to claim 15, wherein the transmit-end delay measurement information further comprises service flow characteristic information of the service flow, and a transmit-end fragment reassembly identifier of a data packet in the service flow, and wherein the receive-end delay measurement information further comprises: the service flow characteristic information, and the receive-end fragment reassembly identifier; and the method further comprises: determining, by the MCP, according to the service flow characteristic information and the fragment reassembly identifier from the DCP corresponding to the upstream TLP, the service flow characteristic information and the fragment reassembly identifier from the DCP corresponding to the downstream TLP, that the transmit-end timestamp information and the receive-end timestamp information are timestamp information corresponding to a same data packet.

19. The method according to claim 15, wherein, within each measurement period one data packet is added with the delay measurement flag.

20. A data collecting point (DCP), comprising:

a non-transitory computer readable medium comprising computer-executable instructions; and a processor in communication with the non-transitory computer readable medium, wherein when the DCP is a DCP managing an upstream TLP, the processor executes the instructions to:

acquire transmit-end delay measurement information obtained by measuring a transmitted service flow by the upstream TLP that is transmitted through a network, wherein the transmit-end delay measurement information comprises transmit-end timestamp information, a service flow identifier of the transmitted service flow, and a TLP identifier of the upstream TLP, and wherein the transmit-end delay measurement information is corresponding to a data packet including a delay measurement flag; and transmit the transmit-end delay measurement information to the MCP;

when the DCP is a DCP managing a downstream TLP, the processor executes the instructions to:

acquire receive-end delay measurement information obtained by measuring a received service flow by the downstream TLP that is transmitted through the network, wherein the receive-end delay measurement information comprises receive-end timestamp information, a service flow identifier of the received service flow, and a TLP identifier of the downstream TLP, and wherein the receive-end delay measurement information is corresponding to a data packet including a delay measurement flag; and transmitting the receive-end delay measurement information to the MCP, wherein, the transmit-end delay measurement information and the receive-end delay measurement information are used to determine a network delay of the network.

21. The DCP according to claim 20, wherein the processor further executes the instructions to: when the DCP is the DCP managing the upstream TLP, and when a first measurement period for measuring the transmitted service flow ends, acquire a first measurement period identifier of the first measurement period, and transmit the first measurement period identifier to the MCP;

when the DCP is the DCP managing the downstream TLP, when a second measurement period for measuring the received service flow starts, acquire start time of the second measurement period, wherein if a difference between the start time and the receive-end timestamp information is not more than a preset duration, the receive-end delay measurement information corresponds to a second measurement period identifier of the second measurement period, and if the difference between the start time and the receive-end timestamp information is greater than the preset duration, the second measurement period identifier is increased by 1, the receive-end timestamp information corresponds to a next measurement period, and the second measurement period identifier is acquired; and transmit the second measurement period identifier to the MCP.

22. The DCP according to claim 21, wherein the preset duration is ⅔ of a duration of the second measurement period.

23. The DCP according to claim 21, wherein when the DCP is the DCP managing the upstream TLP, the processor further executes the instructions to: perform time synchronization with the upstream TLP by using at least one of the Network Time Protocol (NTP) and an IEEE 1588v2 clock, and perform time synchronization between the DCP and another DCP managing a corresponding downstream TLP by using at least one of the NTP and an IEEE 1588v2 clock, and wherein when the DCP is the DCP managing the downstream TLP, the processor executes the instructions to: perform time synchronization with the downstream TLP by using at least one of the NTP and an IEEE 1588v2 clock, and perform time synchronization between the DCP and another DCP managing a corresponding upstream TLP by using at least one of the NTP and an IEEE 1588v2 clock.

24. The DCP according to claim 20, wherein when the DCP is the DCP managing the downstream TLP, the processor further executes the instructions to: acquire a measurement packet transmitted by another upstream TLP and received by the downstream TLP, and arrival timestamp information of the measurement packet, which is generated when the measurement packet arrives at the downstream TLP, wherein the measurement packet comprises transmit-end timestamp information; determine whether the arrival timestamp information and the receive-end timestamp information correspond to a preset duration range; when the arrival timestamp information and the receive-end timestamp information correspond to the preset duration range, determine that the transmit-end timestamp information in the measurement packet and the receive-end timestamp information correspond to a same data packet; and transmit a result of the determining to the MCP.

25. The DCP according to claim 20, wherein the transmit-end delay measurement information further comprises: transmit-end service flow characteristic information and a transmit-end fragment reassembly identifier, and wherein the receive-end delay measurement information further comprises receive-end service flow characteristic information and a receive-end fragment reassembly identifier.

26. The DCP according to claim 20, wherein, within each measurement period one data packet is added with the delay measurement flag.

27. A target logical port (TLP), comprising:
a port;
a processor in communication with the port,
wherein when the TLP is an upstream TLP, the processor is configured to:
determine a first service flow transmitted through the port is a target service flow according to service flow characteristic information of the first service flow;
add a first delay measurement flag to a first data packet of the first service flow; and
acquire transmit-end delay measurement information of the first data packet to which the first delay measurement flag is added, wherein the transmit-end delay measurement information comprises transmit-end timestamp information, a service flow identifier of the first service flow, a TLP identifier of the TLP;
wherein when the TLP is a downstream TLP, the processor is configured to: identify a second data packet to which a second delay measurement flag is added, acquire receive-end delay measurement information of the second data packet, and wherein the receive-end delay measurement information comprises receive-end timestamp information, a service flow identifier of a service flow that is transmitted through the port and comprises the second data packet, and a TLP identifier of the TLP.

28. The TLP according to claim 27, wherein:
when the TLP is the upstream TLP, the processor is further configured to:
add the first delay measurement flag to the data packet of the target service flow, perform time synchronization with the DCP managing the upstream TLP by using at least one of the Network Time Protocol (NTP) and an IEEE 1588v2 clock; and
acquire a measurement period identifier corresponding to the first delay measurement flag, and wherein when the TLP is the downstream TLP, the processor is further configured to:
identify the second data packet to which the second delay measurement flag is added, perform time synchronization with the DCP managing the downstream TLP by using at least one of the NTP and an IEEE 1588v2 clock; and
acquire a measurement period identifier corresponding to the second delay measurement flag and start time of each measurement period.

29. The TLP according to claim 27, wherein
when the TLP is the upstream TLP, the processor is further configured to: transmit a first measurement packet to another downstream TLP, wherein the first measurement packet comprises: transmit-end timestamp information, and
wherein when the TLP is the downstream TLP, the processor is further configured to: receive a second measurement packet from another upstream TLP;
generate arrival timestamp information of the second measurement packet; and
transmit the second measurement packet and the arrival timestamp information to the DCP managing the downstream TLP.

30. The TLP according to claim 27, wherein the transmit-end delay measurement information further comprises transmit-end service flow characteristic information and a transmit-end fragment reassembly identifier, and wherein the receive-end delay measurement information further comprises receive-end service flow characteristic information and a receive-end fragment reassembly identifier.

31. The TLP according to claim 27, wherein the determining the first service flow is the target service flow comprises: determining the first service flow is the target service flow according to at least two tuples in a quintuple of the first service flow.

32. The TLP according to claim 27, wherein, within each measurement period one data packet is added with the delay measurement flag by the upstream TLP.

33. A measurement control point (MCP), comprising:
a non-transitory computer readable medium comprising computer-executable instructions; and
a processor in communication with the non-transitory computer readable medium, wherein
the processor executes the instructions to:
receive transmit-end delay measurement information transmitted by a data collecting point (DCP) corresponding to an upstream target logical port (TLP) and receive-end delay measurement information transmitted by a DCP corresponding to a downstream TLP, wherein the transmit-end delay measurement information comprises transmit-end timestamp information, a service flow identifier of a service flow that is transmitted through a network, and a TLP identifier of the upstream TLP, and wherein the receive-end delay measurement information comprises receive-end timestamp information, a service flow identifier of the service flow, and a TLP identifier of the downstream TLP, and wherein the transmit-end delay measurement information and the receive-end delay measurement information are corresponding to a data packet including a delay measurement flag; and
determine a network delay of the network according to the transmit-end delay measurement information and the receive-end delay measurement information.

34. The MCP according to claim 33, wherein the processor executes the instructions to:
receive a measurement period identifier transmitted by the DCP managing the upstream TLP, and a measurement period identifier transmitted by the DCP managing the downstream TLP;
determine, according to the measurement period identifier transmitted by the DCP managing the upstream TLP and the measurement period identifier transmitted by the DCP managing the downstream TLP, whether the transmit-end delay measurement information and the receive-end delay measurement information correspond to a same measurement period; and
determine the network delay according to the transmit-end delay measurement information and the receive-end delay measurement information, when the transmit-end delay measurement information and the receive-end delay measurement information correspond to a same measurement period.

35. The MCP according to claim 33, wherein the receiving the transmit-end delay measurement information transmitted by the data collecting point (DCP) comprises: receiving the transmit-end delay measurement information transmitted by the DCP corresponding to the upstream TLP, and the receive-end delay measurement information that is determined as corresponding to a same data packet as the transmit-end delay measurement information and is transmitted by the DCP corresponding to the downstream TLP.

36. The MCP according to claim 33, wherein the transmit-end delay measurement information further comprises transmit-end service flow characteristic information and a transmit-end fragment reassembly identifier, wherein the receive-end delay measurement information further comprises receive-end service flow characteristic information and a receive-end fragment reassembly identifier, and
wherein the processor executes the instructions to:
determine, according to the transmit-end service flow characteristic information, the transmit-end fragment reassembly identifier, the receive-end service flow characteristic information, and the receive-end fragment reassembly identifier, whether the transmit-end timestamp information and the receive-end timestamp information are timestamp information corresponding to a same service flow; and
determine the a network delay according to the transmit-end delay measurement information and the receive-end delay measurement information, when the transmit-end delay measurement information and the receive-end delay measurement information are timestamp information corresponding to a same service flow.

37. The TLP according to claim 33, wherein, within each measurement period one data packet is added with the delay measurement flag.

* * * * *